United States Patent
Publicover et al.

(10) Patent No.: US 12,307,025 B1
(45) Date of Patent: *May 20, 2025

(54) DETERMINING TAP LOCATIONS ON A HANDHELD ELECTRONIC DEVICE BASED ON INERTIAL MEASUREMENTS

(71) Applicant: Kibeam Learning, Inc., Oakland, CA (US)

(72) Inventors: Nelson George Publicover, Bellingham, WA (US); Alexander Paul Barangan, Felton, CA (US); Lewis James Marggraff, Lafayette, CA (US); Marc Michael Thomas, Mokelumne Hill, CA (US)

(73) Assignee: Kibeam Learning, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,956

(22) Filed: Jan. 15, 2024

Related U.S. Application Data

(63) Continuation of application No. 18/117,420, filed on Mar. 4, 2023, now Pat. No. 11,947,399, and a
(Continued)

(51) Int. Cl.
　　*G06F 3/0346*　　(2013.01)
　　*G06F 3/01*　　(2006.01)
　　*G08B 3/00*　　(2006.01)

(52) U.S. Cl.
　　CPC ............ *G06F 3/0346* (2013.01); *G06F 3/016* (2013.01); *G08B 3/00* (2013.01)

(58) Field of Classification Search
　　None
　　See application file for complete search history.

(56) References Cited

U.S. PATENT DOCUMENTS 9,690,426 B1 * 6/2017 Eichwald ............... B60K 35/00
2006/0256075 A1 * 11/2006 Anastas ................. G06F 3/016
　　　　　　　　　　　　　　　　　　　　345/156

(Continued)

OTHER PUBLICATIONS

Authorized Officer Byun, Sung Cheal, Korean Intellectual Property Office, International Search Report for associated International Application No. PCT/US2023/027947, Nov. 3, 2023, 4 pages.

(Continued)

*Primary Examiner* — David H Chu
(74) *Attorney, Agent, or Firm* — William A. English; Vista IP Law Group LLP

(57) ABSTRACT

Systems and methods are described in which the location of a tap on the body of a handheld device is determined in real time using data streams from an embedded inertial measurement unit (IMU). Taps may be generated by striking the handheld device with an object (e.g., a finger), or by moving the handheld device in a manner that causes it to strike another object. IMU accelerometer, gyroscopic and/or orientation (relative to the magnetic and/or gravitational pull of the earth) measurements are examined for signatures that distinguish a tap at a location on the body of the device compared with signal characteristics produced by taps at other locations. Neural network and/or numerical methods may be used to perform such classifications. Tap locations, tap timing, and tap attributes such as the magnitude of applied forces, device orientation, and the amplitude and directions of motions during and following a tap, may be used to control or modulate responses within the handheld device and/or actions within connected devices.

26 Claims, 11 Drawing Sheets

Related U.S. Application Data continuation of application No. 17/874,253, filed on Jul. 26, 2022, now Pat. No. 11,614,781.

(56) References Cited

U.S. PATENT DOCUMENTS

| | | | | |
|---|---|---|---|---|
| 2011/0027766 | A1* | 2/2011 | Yoo | A61B 3/032 |
| | | | | 434/262 |
| 2015/0172838 | A1* | 6/2015 | Kuk | A61B 5/7475 |
| | | | | 381/314 |
| 2017/0279957 | A1* | 9/2017 | Abramson et al. | G06F 21/36 |
| 2018/0321843 | A1* | 11/2018 | Giannotti | G06F 3/0481 |
| 2019/0110334 | A1* | 4/2019 | Raje | H04W 88/085 |
| 2020/0285996 | A1* | 9/2020 | Janakiraman | G06N 20/00 |
| 2022/0084517 | A1* | 3/2022 | Garg | B64D 47/00 |

OTHER PUBLICATIONS

Authorized Officer Byun, Sung Cheal, Korean Intellectual Property Office, Written Opinion for associated International Application No. PCT/US2023/027947, Nov. 3, 2023, 6 pages.

* cited by examiner

DETERMINING TAP LOCATIONS ON A HANDHELD ELECTRONIC DEVICE BASED ON INERTIAL MEASUREMENTS

RELATED APPLICATION DATA

The present application is a continuation of application Ser. No. 18/117,420, filed Mar. 4, 2023, which is a continuation of Ser. No. 17/874,253, filed Jul. 26, 2022, now U.S. Pat. No. 11,614,781, the entire disclosures of which are expressly incorporated by reference herein.

TECHNICAL FIELD

The present application relates generally to systems and methods for an individual to perform machine-based interactions using a handheld electronic device. Although the handheld device may be used by anyone, it is particularly well-suited for use by a young child, utilizing simple interactive movements that lack requirements for precision manual dexterity and/or understanding complex interactive sequences. Systems and methods herein employ techniques within the fields of computer programming, electronic design, firmware design, inertial measurement units (IMUs), ergonometric construction, device controls, human motor control and human-machine interactions. Systems and methods may provide a user, especially a young child, with an intuitive machine interface to rapidly and/or instinctively interact within an environment composed of real and/or virtual objects.

BACKGROUND

In recent years, the world has become increasingly reliant on portable electronic devices that have become more powerful, sophisticated and useful to a wide range of users. However, although children may rapidly embrace using some aspects of electronics designed for more experienced users, young children may benefit from having access to interactive electronic devices that are small, light-weight, colorful, playful, informative, ergonomically designed for a child (including being child-safe), and easy to use. The systems and methods disclosed herein make use of recent advances in the fields of haptic technologies, sound generation using miniature speakers, portable displays, and inertial measurement units (sometimes also referred to as inertial motion units).

Within a handheld device, alerts may be generated by a haptic unit (also known as kinaesthetic communication) and/or a miniature speaker. Haptic units generally employ an eccentric (i.e., unbalanced) rotating mass or piezoelectric actuator to produce vibrations that can be felt. Along similar lines, the vibrations of a miniature speaker are generally produced using a traditional (i.e., associated with larger speakers) electromagnetic moving coil or piezoelectric (so-called buzzer) designs.

Two-dimensional visual displays are composed of any number of monochromatic or multi-colored, addressable light-sources or pixels. Displays may range from a single light source (e.g., illuminating an orb, transmitted via a waveguide), to those that are capable of displaying a single number (e.g., seven-segment display) or alphanumeric character (e.g., a five-pixel by eight-pixel array), to high-resolution screens with tens of millions of pixels. Regardless of scale, displays are typically implemented as: 1) a two-dimensional array of light sources (most frequently light-emitting diodes (LEDs), or 2) two plates of polarized glass that sandwich liquid crystal material (i.e., forming a liquid crystal display or LCD) that responds to an electric current by allowing different wavelengths of light from one or more illumination sources (i.e., a backlight) to pass.

Inertial measurement units (IMUs) may incorporate any or all combinations of: 1) linear accelerometers measuring forces generated during movement (i.e., governed by Newton's second law of motion) in up to three axes or dimensions, 2) gyroscope-based sensing of rotational rates or velocities in up to three rotational axes, 3) magnetometers measuring magnetic field (i.e., magnetic dipole moment) including fields generated by the earth, and/or 4) the gravitational pull of the earth (including gravitational orientation) by measuring forces on an internal mass. The accuracy of IMUs varies widely, depending on size, operating range, compensating hardware that may be used for correction of measurements (affecting cost), environmental factors including thermal gradients, the availability of individual device calibrations, and (integration) time required to perform measurements.

Advances in both electronics (i.e., hardware), standardized communications protocols and allocation of dedicated frequencies within the electromagnetic spectrum have led to the development of a wide array of portable devices with abilities to wirelessly communicate with other, nearby devices as well as large-scale communications systems including the World Wide Web. Considerations for which protocols (or combinations of available protocols) to employ within such portable devices include power consumption, communication range (e.g., from a few centimeters to hundreds of meters and beyond), and available bandwidth.

Currently, Wi-Fi (e.g., based on the IEEE 802.11 family of standards) and Bluetooth (managed by the Bluetooth Special Interest Group) are used within many portable devices. Less common and/or older communications protocols within portable devices in household settings include Zigbee, Zwave, IR (infrared), and cellular- or mobile phone-based networks. In general (i.e., with many exceptions, particularly considering newer standards), compared with Bluetooth, Wi-fi offers a greater range, greater bandwidth, and a more direct pathway to the internet. On the other hand, Bluetooth offers lower power, a shorter operational range (that may be advantageous in some cases), and less complex circuitry to support communications.

Advances in miniaturization, reduced power consumption and increased sophistication of electronics, including those applied to displays, IMUs and telecommunications have revolutionized the mobile device industry. Such portable devices have become increasingly sophisticated, allowing users to concurrently communicate, geolocate, monitor exercise, track health, be warned of hazards, capture videos, perform financial transactions, and so on. Systems and methods that facilitate simple and intuitive interactions with a handheld device, particularly for use by children, may be useful.

SUMMARY

In view of the foregoing, systems and methods are provided herein that describe a light-weight, simple-to-use and intuitive handheld device that may be particularly well-suited for machine-based interactions by a young child. Although the device may, in part, be accepted by a child as a toy, the computational flexibility embedded within the device may allow the device to be used as a means for both machine-based and human interaction (particularly involving individuals who may be located remotely), play, embodied learning, emotional support, communications, expressing creativity, and enhancing imagination. Additionally, a portable, "fun" handheld device may motivate physical movement by a child (or adult) including kinetic motions and kinesthetic activities.

Young children may observe older children and adults perform a wide range of activities over extended periods of time using mobile devices, such as cell phones and tablets. However, young children generally need to first develop precision motor skills (e.g., to touch a specific icon on a touch-sensitive display) and intellectual sophistication to navigate graphical user interfaces (GUIs) on such devices to achieve desired ends. Even the notion of pressing on one or more simple pushbuttons (e.g., that might be painted in bright colors) to achieve a desired goal is generally a concept that must first be learned by a young child. However, tapping anywhere upon a handheld, lightweight device body, or tapping the device against a solid surface, particularly in response to a visual, tactile, or auditory cue, may provide a child with an intuitive method to use a handheld device within mixed, real and/or virtual environments without substantial instruction or precision motor skills.

Determining both the presence (including timing) of a tap as well as its location on the handheld device (including any affixed components) may be determined by classifying electronic signatures from data gathered from at least one inertial measurement unit (IMU) embedded within the handheld device. As outlined in the Background section above, IMU data may be derived from sensing combinations of translational acceleration, gyroscopic (i.e., rotational) velocity, magnetic force (i.e., including forces applied by the earth's magnetic field) and/or gravitational force (i.e., resulting from the earth's large mass). In most multi-dimensional (i.e., up to three axes) implementations, IMU data may be considered time-varying sequences of vectors, containing both magnitude and directional information of sensed accelerations, orientations and/or forces.

A finger (i.e., of either hand) is a convenient and intuitive "tool" to tap a handheld device. Within the English language, the term "finger" may convey an ambiguous meaning. Within much of the scientific world, "finger" refers to any appendage of a hand used for manipulation and sensing. However, in some instances (including in medicine), the thumb (containing two bones or phalanges) is considered distinct from fingers (containing three phalanges) due to differences in size, rigid structures, joints and/or function. Within descriptions herein, the term "finger" or (interchangeably) "digit" refers to any hand protrusion, including the thumb.

Along similar lines, the verb "tap" is used herein to describe an action involving the striking of one object against another object with a discernible moment of contact, sudden change in acceleration, change in direction, and/or other discernible signal(s) that contact between objects has been made. Once contact is made, either object may be retracted from the striking process, a sound may be produced, and/or either object may temporarily be deformed during the process. As a noun within the English language, tap has a number of meanings including referring to the sound sometimes made upon striking objects together. As used herein, "tap" refers to the overall action or process of striking two objects together. Also, as noted below, the singular forms "a," "an," and "the" include plural referents unless the context clearly dictates otherwise.

Tap forces may be transmitted to the one or more embedded IMUs as a result of a tap on the handheld device body including any affixed components (i.e., forming a solid structure), where such rigid structures transfer forces in the direction of the tap during the time of impact (i.e., during the tap). In accordance with Newton's second law, such forces may result in translational movements of the handheld device in any of three dimensions (i.e., often denoted as X, Y and Z, see FIG. 5). Forces may also result in rotational movements of the device (i.e., often described as pitch, roll and yaw, see FIG. 5) where the geometric center of the device and/or the functional center of an IMU may, for example, be used as a reference (i.e., an origin) as one method to describe such motions. During mathematical analyses, it may also be convenient to consider other locations (e.g., contact points of a hand holding the device, contact point of a tap) to position the origins of coordinate systems and/or vectors representing forces, orientations (e.g., relative to the gravitational pull or attraction of the earth), accelerations, velocities and motions.

A tap may be generated by a user by tapping a finger of an opposing hand (i.e., the hand opposite the hand holding or cradling the device) onto the device, tapping an opposing hand (e.g., knuckle, palm) onto the handheld device, tapping a digit of the hand holding the device onto the device, tapping any other body part of the user onto the handheld device, using a solid object such as a pen or stylus to tap on the device, or tapping the handheld device itself onto an object or surface (i.e., including a body part such as a knee or wrist; or other object such as an image or text within a page of a book, desktop, floor, and so on). A tap may also be generated by tapping the handheld device against another handheld device (e.g., while mimicking battle using swords or sabers). Resultant actions to taps between devices may, for example, be specifically restricted (i.e., by sensing tap location) to tapping a selected display on one device onto a target display of the second handheld device (e.g., during a process of exchanging information between devices and/or device users).

When causing a location on the handheld device to impact a surface, there is no requirement for the surface to be absolutely rigid. For example, when tapping the device onto one's knee or the palm of an opposing hand, there may be some temporary deformation, at least at the level of the skin, during the tap. As further examples, when tapping stuffed or stretchable toys, there may be some flexibility of surfaces being tapped. Along similar lines, when tapping on the page of a book or magazine, there may be some give or reactionary movements by the page being tapped.

As described in greater detail in the Detailed Description below, IMU data may be subject to one or more classification processes not only to discern tap location on the handheld device, but also to discern other characteristics of the tap, collectively referred to as tap "attributes." Tap attributes include measures of mechanical characteristics of the object used to tap, magnitudes and directions of forces applied during the tap, movements (including magnitudes and directions) of the handheld device immediately after a tap, the orientation of the handheld device during a tap relative to either or both of the magnetic and gravitational pull or attraction of the earth, and so on.

Such differences in sensed accelerations and forces that are under the control of the device user may allow types and/or attributes of a tap to be classified and subsequently used during controlling activities (e.g., controlling sounds, displays, haptic feedback and/or other actions on the handheld device itself; or controlling virtual objects and/or actions displayed on one or more connected devices). In addition, the timing of a tap, particularly related to the timing of one or more previous taps and/or other events in the environment of the device user (including taps on one or more other handheld devices) may be components of additional control functions by handheld device users.

In accordance with an example, a handheld device is provided for interaction by a device user that includes a device body configured to be held by a first hand of the device user; electronic circuitry within the device body that includes a device processor; at least one inertial measurement unit within the device body operatively coupled to the device processor; and at least one device display affixed to the device body operatively coupled to the device processor, wherein the device processor is configured to: generate a first illumination pattern by the at least one device display; acquire inertial measurement data from the at least one inertial measurement unit; determine, based at least in part on the inertial measurement data, an initial tap location by the device user on one of the device body and the at least one device display; and generate a second illumination pattern by the at least one device display based at least in part on the initial tap location.

In accordance with another example, a handheld device is provided for interaction by a device user that includes a device body configured to be held by a first hand of the device user; electronic circuitry within the device body that includes a device processor; at least one inertial measurement unit within the device body operatively coupled to the device processor; and a speaker within the device body operatively coupled to the device processor, wherein the device processor is configured to: generate a first sound by the speaker; acquire inertial measurement data from the at least one inertial measurement unit; determine, based at least in part on the inertial measurement data, an initial tap location by the device user on the device body; and generate a second sound by the speaker based at least in part on the initial tap location.

In accordance with yet another example, a handheld device is provided for interaction by a device user that includes a device body configured to be held by a first hand of the device user; electronic circuitry within the device body that includes a device processor; at least one inertial measurement unit within the device body operatively coupled to the device processor, wherein the device processor is configured to: acquire inertial measurement data from the at least one inertial measurement unit; compute directional data and magnitude data from the inertial measurement data; determine, based at least in part on one or both of the directional data and the magnitude data, an initial tap location by the device user on the device body; and perform an action based at least in part on the initial tap location on one or both of the device processor and a remotely connected processor.

Other aspects and features including the need for and use of the present invention will become apparent from consideration of the following description taken in conjunction with the accompanying drawings.

BRIEF DESCRIPTION OF THE DRAWINGS

A more complete understanding may be derived by referring to the Detailed Description when considered in connection with the following illustrative figures. In the figures, like-reference numbers refer to like-elements or acts throughout the figures. Presented examples are illustrated in the accompanying drawings, in which.

DETAILED DESCRIPTION

Figure 1A:
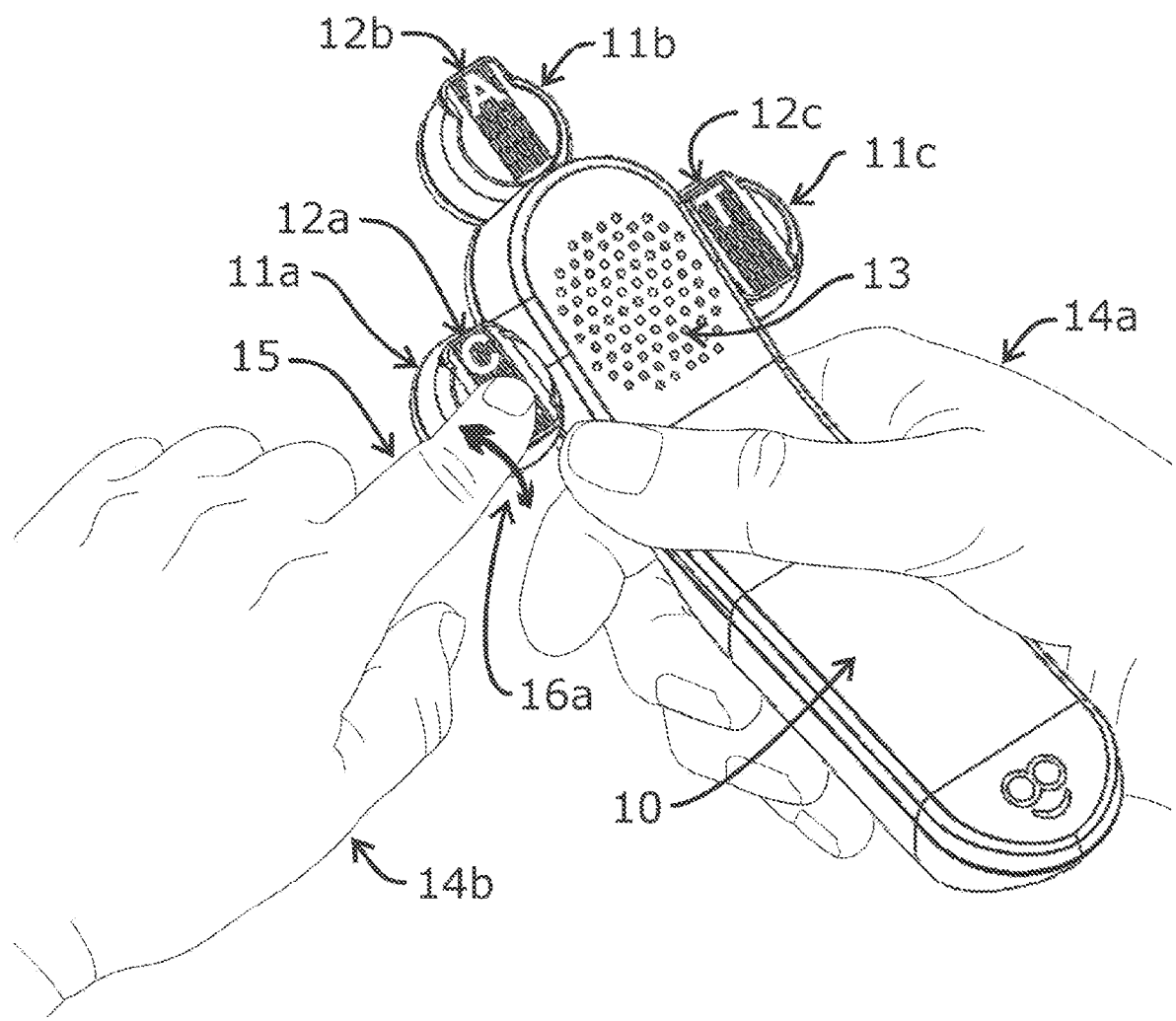
FIG. 1A illustrates the use of an index finger of a hand that opposes the hand holding a handheld device to tap on the left-most device display (projecting the letter "C") as a means of interaction by a device user.

Before the examples are described, it is to be understood that the invention is not limited to particular examples described herein, as such may, of course, vary. It is also to be understood that the terminology used herein is for the purpose of describing particular examples only, and is not intended to be limiting, since the scope of the present invention will be limited only by the appended claims.

Unless defined otherwise, all technical and scientific terms used herein have the same meaning as commonly understood by one of ordinary skill in the art. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

As introduced in the Summary above, a tap may be generated by intentionally moving and subsequently causing an object (i.e., a "striking object") to hit a location on the surface of a handheld device (i.e., "tap location") selected and/or targeted by the user. The striking object may, for example, be a finger of an opposing hand, any other body part, a digit of the hand holding the device, a stylus, a stick, a pencil, and so on.

Tap forces may also be generated by causing (i.e., moving with intent) the target location or area on the surface of the handheld device to collide with a solid surface (or, at least a partially rigid surface such as human skin, stuffed toy or page within a book). Combining such motions, both the handheld device and another object (e.g., child's toy, hand) may be moved simultaneously toward each other. In general, relative movements of the handheld device compared with the surface being tapped determine tap characteristics (e.g., peak force, accelerations, computed tap location) versus which object is moved (e.g., relative to the ground or other objects in the environment of a user). IMU data streams prior to and following the tap may help to determine whether a striking object was used to tap a stationary device, the device was forcefully moved toward another object (e.g., see FIG. 4C), or both processes occurred simultaneously.

Figure 5:
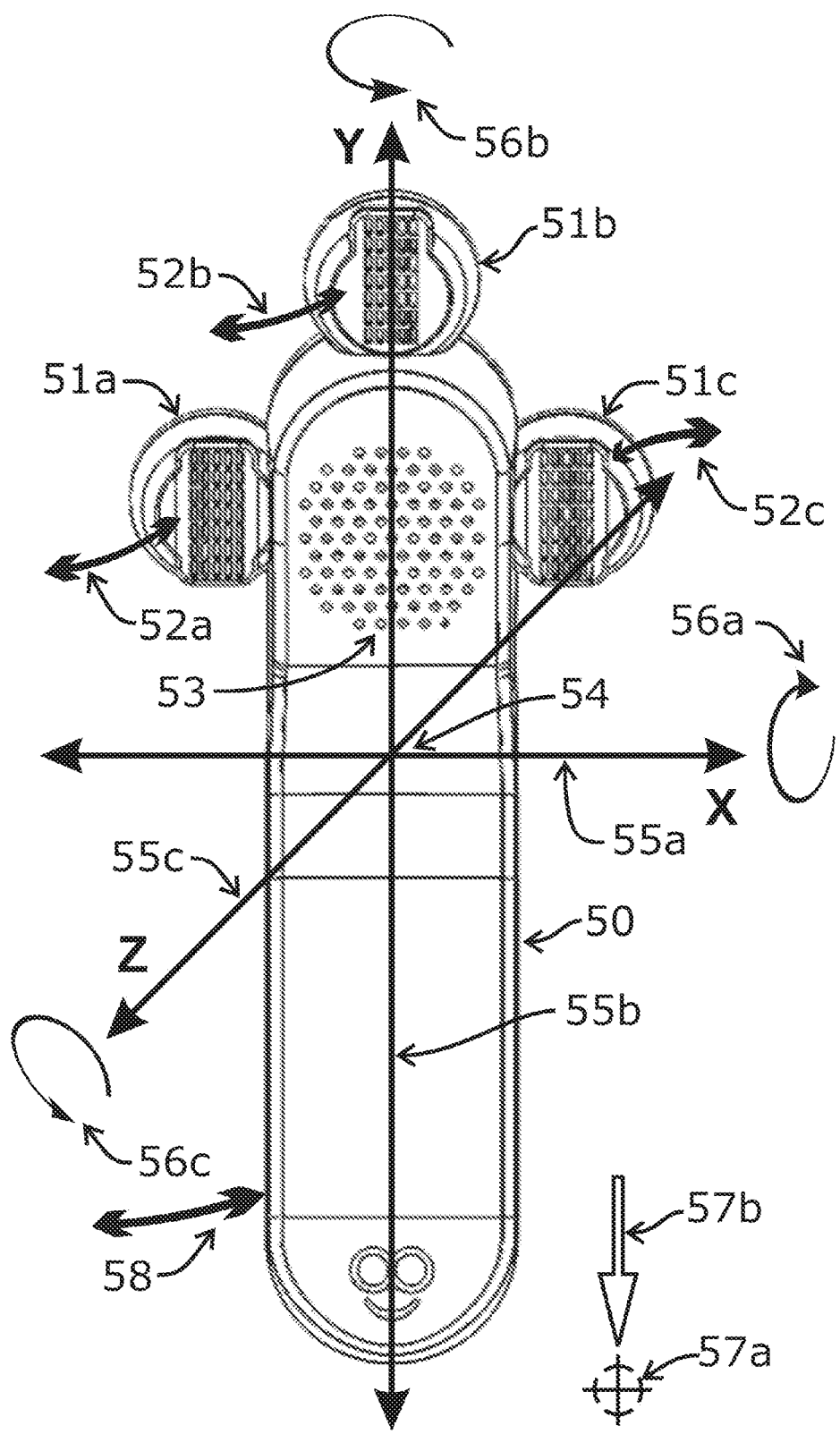
FIG. 5 demonstrates examples of coordinate systems and rotational axes that may be used to describe movements, velocities and accelerations in different dimensions as a component of processes to compute tap locations on the handheld device from acquired IMU data.

As introduced in the Background section above, IMU data streams may be comprised of one or more of:
1. up to three channels (i.e., representing three spatial dimensions often denoted X, Y and Z; see FIG. 5) of accelerometer data, and
2. up to three channels (i.e., representing rotation around 3 axes; see FIG. 5) of gyroscope rotational velocities.

Both acceleration and gyroscopic data may be expressed as one or more time-varying vectors using, for example, Cartesian, polar and/or spherical coordinate systems (see FIG. 5).

Optionally, data streams indicating orientations of the handheld device relative to either or both of the gravitational and magnetic pull or attraction of the earth may be considered. Such orientation data may be a component of processes to determine tap location. For example, if a device is being cradled within a hand "upside-down" (or, at least not being held in an intended manner) by a device user (i.e., in any of up to three spatial dimensions), then expected acceleration and/or gyroscopic data streams may be considered using transformed coordinate systems that reflect a measured or atypical device orientation. In addition, potential enumerated tap locations may be redefined based on the possibility that one or more surfaces of the handheld device may be more accessible and others hidden as a result of such repositioning by the hand holding the device.

Device orientation data may also be used to express movements of the handheld device relative to previous movements of the device (e.g., when sensing sequential rotation of the device similar to turning a traditional knob), and/or motions relative to other objects in the environment of the device user such as a viewable display screen. Within additional examples of implementations, if the orientation (e.g., relative to gravitational attraction) of a vertically oriented display screen is known and IMU data streams include the direction of gravitational pull relative to the body of the handheld device, then displayed images of the movements of the handheld device (or any virtual object being controlled by the device such as a puppet or virtual toy) may be made to appear in the same orientation as the physical device, or any other selected viewing perspective. Within further examples, the orientation of a device (i.e., relative to the magnetic or gravitational attraction of the earth) during a tap may be used to define one or more tap attributes (described more fully below) that may be used as a component of controlling functions of the handheld device by controlling or modulating actions on the device itself and/or on a connected device (e.g., a connected tablet).

Determining a tap location on the handheld device may be considered a classification process that uses patterns (e.g., compared with a template) or "signatures" within IMU data streams to compute most probable tap locations. An initial step in such classification processes is to identify one or more methods to specify potential tap locations on the surface of the handheld device. One method to indicate potential tap locations involves coating the surface of the device with a virtual mesh (e.g., made up of triangular, finite elements) or rectangular grid pattern (i.e., within in a curved two-dimensional or three-dimensional space) where mesh or grid intersections may represent potential tap locations. This process effectively assigns the surface of the handheld device with a uniform spatial distribution of potential tap locations. One disadvantage of this approach is that taps at two or more nearby grid locations might not produce (i.e., at least within the variability of different users, different tap strengths, different hand grips, and so on) tap signatures that can be distinguished (i.e., uniquely classified) from each other.

Another exemplary method to identify tap locations involves enumerating a desired number of distinct locations on the device surface. Effectively, enumeration allows multi-dimensional locations on the device to be collapsed into a single target classification data set, where the number of potential tap locations is related to (i.e., effectively defines) a spatial resolution for tap locations within regions. Such enumeration schemes allow the density of potential tap locations to vary over the surface of the device to, for example, account for lower spatial resolution when determining tap location in some regions of the device (e.g., in regions normally covered by a hand) and/or when using applications that may benefit from more closely spaced tap locations (e.g., in regions around one or more displays, see FIG. 1A).

As examples during different applications, only three tap locations (e.g., on each of three displays, see FIGS. 1A and 1B) may be required when responding to simple queries; whereas other applications may utilize or attempt to discern dozens of different tap locations throughout the various surfaces of the device. In addition to tap locations on one or more affixed displays (e.g., see FIGS. 1A and 1B), tap locations may include a region of a speaker or buzzer (see FIG. 2), anywhere on a top surface of the device body, a device edge or corner, or any of the surfaces on the opposite sides or edges of the device body or exterior elements just listed.

Conversion of analog IMU data into a digital form, suitable for numerical processing, may use analog-to-digital (A/D) conversion techniques, well-known in the art. IMU sample rates may generally be in a range from about 100 samples/second to about 10,000 samples/second where (as described further in the Background section, above) higher IMU sample rates involve trade-offs involving signal noise, cost, power consumption and/or circuit complexity. Because a tap is a relatively rapid event (e.g., generally lasting in a range from about 10 to 100 milliseconds), higher IMU A/D sample rates may allow more distinct tap locations on the handheld device to be discerned.

Within examples of implementations, IMU sampling rates may be changed dynamically. For example, during most times, slower sample rates may be used to conserve power and computing resources (e.g., when discerning non-tap, hand movement-based gestures). As soon as an increased signal (i.e., indicative of a tap) is sensed within accelerometer and/or gyroscope data streams, A/D sample rates may be increased up to the maximum available for the IMU device. Alternatively, or in addition, high-rate sampling may be buffered (e.g., held within a circular buffer) via hardware or firmware. When a potential tap is detected, one or more processors may retrieve samples within the buffer prior to the detection of the tap to assess more accurately, for example, an earliest time of a tap (e.g., extrapolating one or more signals exceeding a threshold back to baseline) as well as to include additional samples for classification of acquired data into a tap location. Within further alternative or additional examples, hardware may perform threshold detection (see FIGS. 4A, 4B and 4C), interrupting execution within one or more processing elements (i.e., executing firmware or software) whenever a tap is detected by hardware elements.

In broad terms, classification processes to convert IMU data into a tap location may include two overall approaches: 1) numerical approaches that may include multi-channel template matching and/or frequency domain (e.g., Fourier transform) analyses, and 2) neural network approaches in which a network is trained using data sets of taps at known locations collected under a variety of conditions (e.g., different users, distinct digits or other objects used to tap, various hand sizes and/or positions holding the device, varying tap forces, different device orientations). Such training data sets may be acquired from an individual user (or small number of users) who (e.g., due to age or ability to articulate) may have limited ranges of force and/or tap locations. Alternatively, or in addition, a wide range of users may be used to generate neural network training data sets (e.g., particularly involving taps using fingers) that may then be applied globally (i.e., to any device user).

Numerical approaches may utilize a computational model of the handheld device coupled with contact locations by the hand holding the device. From such considerations, expected magnitudes, timing and directions of forces applied during taps at different locations on the device may be estimated. Template matching techniques may then be applied on all, or a subset, of IMU data streams. For example, template waveforms (e.g., modelled and/or empirically acquired) from each potential tap location may be compared with acquired data to compute correlation coefficients (or similar measures). Template waveforms associated with a location with the highest correlation corresponds to a most likely tap position. Alternatively, or in addition, simply comparing the sequence of positive and negative peaks within acquired data to those within template waveforms (e.g., across all available IMU channels) may be sufficient to uniquely identify a tap location, particularly when (e.g., based on interactive activities being performed) there is a small number of target tap locations.

During such calculations, it may be helpful to use one or more polar and/or spherical coordinate systems to consider more readily three-dimensional (e.g., rotational) velocity and acceleration vectors, for example, about contact points including the functional center of the IMU and/or the hand holding the device. It may also be helpful to convert time-based IMU data streams into a frequency domain (e.g., processed using multidimensional Fourier transforms) to determine presence of characteristic frequency components and phase differences (i.e., related to time and/or sequence) among frequency components within data streams that may help to distinguish different tap locations.

Neural network approaches may include using the IMU data streams as inputs to one or more neural networks comprising, for example, either a single output that identifies a maximum likelihood tap location (e.g., indicating an enumerated tap location) or a binary (i.e., yes/no) output associated with each location. Either neural network configuration may additionally be configured to supply a confidence level (or an equivalent measure) related to the degree of match at each potential tap location. Neural networks may also be trained to output one or more tap attributes described in more detail below. Tap attributes include, for example, forcefulness of the tap, handheld device orientation, device movements at the time of the tap, whether struck by a soft or rigid object, whether struck by a finger of an opposing hand (versus the hand holding the device), and so on.

Techniques known in the art for digital signal processing (DSP) of such time-varying data streams may be used where: 1) multi-layer perceptron (MLP) and 2) recurrent neural network (RNN) are examples of network topologies (i.e., suitable for processing time-based data streams). Backpropagation may typically be used to train such networks. Optionally, neural networks may be made adaptive by noting when corrections are made within virtual activities controlled by the handheld device. Such adaptive corrections may use supervised learning approaches to further train a neural network.

Depending on factors such as IMU sample rate, noise within IMU data, mechanical design of the handheld device, computational approaches and temporal/mechanical consistency of taps produced by a user (or other users of the device), algorithms to convert IMU data into tap locations may target any number of distinct tap locations. Tap locations on the handheld device may be used as an input to control or modulate resultant "actions" in real and/or virtual worlds.

Such actions may be: 1) strictly confined to the handheld device such as a haptic vibration, sound or symbol displayed on the handheld device, 2) transmitted to another device in the environment of the device user (e.g., sound generated by a nearby speaker or image displayed on a nearby screen), and/or 3) transmitted to remote devices (i.e., handheld or otherwise) where taps and/or their locations may signal displays, audio and/or other indicators to remotely connected individuals.

As described further below, the time of occurrence of a tap (including intervals between taps) may additionally be used as a component to control or modulate actions ensuing from the tap. A number of methods may be used to determine a time of occurrence of a tap including:

1. the time of an initial detection of an acceleration or velocity component greater than a threshold level, optionally including techniques involving extrapolation of multiple samples collected prior to exceeding the threshold, back to a baseline to increase precision of the initiation time estimate,
2. the time of maximum (i.e., peak) acceleration or velocity, that also may consider multiple sample points (e.g., fit to a parabola) to increase the precision of determining such peaks, and/or
3. midway (or any other selected reference) between initially exceeding a threshold level and returning to less than the threshold, where extrapolation techniques (e.g., linear fitting) that consider multiple samples within threshold regions may be used to increase precision.

In addition to using the time between taps as one input to control or modulate resultant actions, the time between a "stimulus" such as a haptic vibration, sound or symbol displayed on the handheld device, or other stimulus sensed in the environment of the device user (e.g., broadcast sound, image displayed on a distant screen) versus a response tap time may optionally be used as an additional modulator of actions. Such tap-timing commands may be deliberate (i.e., where the device user intentionally times when one or more tap responses occur) or unforced (i.e., where the stimulus-response time is measured by the device in a manner that may be unknown to the user). Resultant actions controlled or modulated, at least in part by stimulus-response tap timing may be within the handheld device (e.g., display of one or more symbols, generation of one or more sounds, haptic vibrations) and/or tap times may be transmitted to other devices (e.g., tablet, laptop, electronic book) where resultant actions are performed or modulated, at least in part by measurements of tap-timing produced on the handheld device.

Within additional exemplary configurations, times between taps may be measured using two or more handheld devices (e.g., by two or more collocated individuals or who may be located remotely and connected via telecommunications). For example, one device user may initiate an action within a virtual environment by a tap on a first handheld device. Within a predetermined time, a second user may complete the virtual action by tapping on a second device. Measured times between taps and/or other control functions using two or more handheld devices may be performed by any number of device users. Such multi-user, shared control using taps may be particularly useful during game-play activities and other shared activities within virtual environments. Shared control of such activities (including the use of handheld devices) is described in U.S. Pat. No. 11,334,178, filed Aug. 6, 2021 and application Ser. No. 17/531,571, filed Nov. 19, 2021, the entire disclosures of which are expressly incorporated herein by reference.

Optionally, within additional examples of implementations, device orientation may be used as an input to control or modulate resultant actions. Device orientation may be determined from IMU components that sense the direction of the gravitational pull and/or magnetic field of the earth, as described in more detail above. As an example, a tap performed when the handheld device is held substantially horizontally may be used to indicate a "no" answer by the device user during a dialog; whereas, when the handheld device is held up vertically, a "yes" answer may be indicated. Orientation of the handheld device may additionally be used over a continuous range of orientations during one or more taps (e.g., partially up or down, analogous to the orientations of hands on a clock). For example, handheld device orientation may be used to select a particular hue or color (i.e., over a continuous range) while drawing.

Along similar lines within further examples, the force of a tap (e.g., determined particularly from the amplitudes of magnitude peaks within IMU data streams (e.g., see FIGS. 4A, 4B and 4C) may be used to convey a continuous range of control or modulation of resultant actions. For example, when an orientation of a device is used to indicate a "yes" or "no" answer, as just described, a forceful tap may be used to indicate a strong degree of certainty by a device user that a response is correct. Conversely, a light tap may be used to indicate an uncertainty in a response.

In addition to peak forces, other waveform characteristics or "signatures" within IMU data streams may be used to identify a source of a tap that may, in turn, be used to control or modulate resultant actions. Such signatures with IMU data may include tap direction, duration, frequency components and phase differences that may, for example, help identify which hand or a particular finger used to generate a tap. At least within a small number of device users, tap characteristics may even distinguish which user is holding the device based on factors such as the size of a hand and how solidly the device is held (i.e., determining resultant device movements as a consequence of the forces applied during a tap) and/or how the device is cradled within a larger versus smaller hand (i.e., resulting in different contact points that constrain device movements during a tap). In further examples, tap signature may distinguish the use of a stylus or pencil (versus a finger) to tap a device.

In yet further examples, tapping the device onto a rigid, immovable surface such as a desk or floor may be distinguished from a more forgiving surface such as a page within a book or stuffed toy. Tapping onto a rigid structure, compared with tapping soft tissues of most superficial body parts, generally produces tap forces (i.e., sensed by one or more IMUs) that are shorter in duration, higher in peak amplitude, and contain higher compression-wave frequency components throughout the tap (see FIG. 4C). Conversely, tapping an object that may provide some "give" during the tap generally produces forces and resultant (i.e., measured) accelerations that are longer in duration, lesser in peak amplitudes and contain lower compression-wave frequencies.

The physical location of a handheld device as well as its orientation in (three-dimensional) space may be further determined by camera-based tracking of the handheld controller. Camera-based measures of the handheld controller (e.g., orientation in the field-of-view of the camera including relative to other objects in the field-of-view, location, velocity, acceleration) may be combined with IMU-based data streams to provide further control or modulation of resultant actions. Systems and methods to determine such camera-based measures are described in U.S. Pat. No. 11,334,178, filed Aug. 6, 2021 and application Ser. No. 17/531,571, filed Nov. 19, 2021, the entire disclosures of which are expressly incorporated herein by reference.

In summary, the identification of a tap and its location on the handheld device may be considered only one of a number of control features (e.g., "tap attributes") that may be used to direct or modulate (i.e., influence) actions. The following list summarizes measured attributes of handheld device taps that, in turn, may facilitate interaction with actions and/or activities embedded within the handheld device, and/or that may be transmitted to other electronic devices (e.g., tablets, laptops, electronic book or magazine). Tap attributes may be used to interact with the real world (e.g., to control internet-of-things components such as light switches and thermostats) and/or within a virtual environment (e.g., to control cartoon-like avatars and virtual book page turns):

1. The presence of a tap and its time of occurrence, particularly related to the occurrence of other events in the environment of a device user, may be used as a primary control feature. As a visual example, a tap (i.e., anywhere on the handheld device) may be used to control the time when to turn a page within a virtual book displayed on a connected tablet device. As an auditory example, the presence of a tap may be used to indicate a selected answer immediately following articulation of the answer within a series of possible answers broadcast using a speaker (e.g., on the handheld device or a nearby electronic device).

2. The determined location of a tap on the handheld device may be used to control or modulate actions, particularly when making a so-called "one-of-N" selection. As an example, the surface of the handheld device may be "mapped" to the appearance of a human body shape, avatar, animal, or other object displayed on a connected screen. In this example, the top, bottom, and sides of the handheld device may correspond to the top, bottom, and sides (i.e., a similar spatial alignment) of the object appearing on the screen. Tapping at specific locations on the handheld device may be used to indicate that subsequent movements of the handheld device are reflected in motions of the component selected by the tap (e.g., head or arms of a puppet).

3. The applied force or strength used to tap may be measured (e.g., within peak amplitudes of acceleration). Distinctions may be made between light taps and more forceful ones, for example, to indicate confidence in an answer or urgency to enact an action under the control of the handheld device.

4. In addition to the overall force applied during a tap, the (more subtle) timing of different force characteristics may also be used to identify or discern characteristics of the objects striking the handheld device. For example, the striking of a pencil or stylus may be distinguished from the use of a (e.g., relatively softer) finger of an opposing hand. Slight movements prior to a strike may distinguish the use of a finger on the opposing hand versus a digit of the hand holding the device. Considering device movement over an even longer period of time may help distinguish whether an object is moved to strike the device versus moving the handheld device itself to stroke another surface.

5. The interval between any two taps may generally be precisely controlled by a device user and subsequently measured. As a simple example, distinguishing long-duration versus short taps provides a simple method for binary (e.g., "yes" versus "no") control. The continuous nature of measuring such intervals (i.e., at least up to an ability for a typical user to accurately indicate a temporal interval) may be particularly useful. As an example, an interval between taps may be used to control screen brightness (i.e., over a continuous range of screen illumination).

6. Determining the temporal alignment of multiple and/or patterns of tapping provides an even wider range of temporal control functions. Tap intervals may be compared to temporal standards (e.g., one-second, two-second, etc.) or to each other (e.g., short tap followed by two longer taps) to encode meaning to tap sequences. Greatly extending the notion of conveying control through tap patterns, taps may be used to indicate musical melodies, pre-assigned interpretations (e.g., long intervals to increment units of hours while short taps increment minutes while setting a clock), or even Morse code.

7. Movements of the handheld device between (as well as during) taps may provide further attributes during device-enabled control functions. Both magnitude and/or direction of movements (including velocity and/or acceleration) during tap and inter-tap intervals may be considered. As a simple example, a direction of movement before or following a tap may be used to indicate whether a page turn within a virtual book should be in the forward or reverse direction. Within a further example that takes into account both magnitude and directional of inter-tap measurements, if an object on a screen is a focus of attention (e.g., a person speaking), a nearby displayed object may be specified by a handheld device user as a new focus by indicating distance and direction (i.e., relative to the previous focal location) between two taps.

8. Orientation relative to either or both of the magnetic field and gravitational pull or attraction of the earth during a tap may provide additional tap attributes. As an example of a binary selection, tapping the handheld controller when raised vertically may be used to indicate approval of a selection (e.g., indicated by another person, visualized on a screen or vocalized via a speaker), whereas a tap when the device is held substantially horizontally may indicate disapproval. As a further example involving a continuous range of control using device orientation, the handheld device may be held vertically, and then rotated and tapped (e.g., while visualizing the face of a traditional clock) to control the intensity of a connected (e.g., via internet-of-things) light. If the orientation of one or more other objects (e.g., relative to the gravitational pull of the earth) is known, then the orientation of the handheld device may be computed relative to those objects. In other words, the gravitational pull of the earth may provide a common reference direction for both the handheld device and other objects. As an example, if a display screen is oriented vertically, then the three-dimensional orientation of the handheld device at the time of a tap may be used to compute a three-dimensional viewing perspective of one or more items drawn on the screen (e.g., including a puppet or an image of the handheld device itself).

9. Taps attributes generated on one handheld device may be combined (i.e., in real time) with taps attributes generated on one or more additional handheld devices. Additional devices may be collocated with the device user and/or used by interconnected users located remotely. A second handheld device may even be controlled by the second hand of a device user.

Considering these handheld device manipulations as an ensemble, a number of tap attributes may be used in various combinations to intuitively and effectively generate a large number of real-time controls within virtual environments that, in turn, may also control aspects of the real-world environment. As an example of the latter, the controller may be used to tune a multi-speaker sound system where, once a speaker-volume control function has been selected, tap location on the handheld device is used to designate which speaker or combination of speakers is to be controlled. Multiple speakers may be specified by two or more rapid taps at differing locations on the handheld device. The device may then be rotated within a frontal plane to control the speaker(s) volume (e.g., analogous to a volume control knob) along with movements in and out of this plane to control a balance of bass versus treble.

As a further example, in this case within a virtual environment, and using simple, intuitive controls that may be suitable for a young child, the handheld device may be used to control a range of aspects of a puppet (or other character, avatar or object) displayed on one or more connected display devices (that may also include remotely connected display devices viewable by others). A single tap on the body of the handheld device may designate that (rotational and/or translational) movements of the device may be reflected in overall body movements of the puppet. A single tap to a side of the handheld device may indicate a desire to control movement of a particular limb. Multiple, closely timed taps may be used to indicate a desire to control multiple limbs at the same time via movements of the handheld device.

As described in more detail above, the spatial or "location resolution" (i.e., number of distinct locations that may be determined by a classification process) may vary within different applications, for example, from just a few tap locations (e.g., to responds to a yes/no question) to a few dozen or more possible distinct tap locations (e.g., to identify different anatomical locations and attire or actions to be controlled on a puppet). The number of potential locations may even vary from tap to tap. For example, a response to a series of questions within a quiz may be selected from one of three possible answers (i.e., each answer indicated by a different tap location) to address an initial question, whereas the next question within the quiz may be selected from six possible answers (i.e., again, where each potential answer is associated with a distinct tap location).

Within additional implementation examples, classifying dynamically changing numbers of locations may be addressed by using distinct classification processes (e.g., distinct neural networks that have been trained based on taps at different numbers of potential tap locations) or by combining the outputs of classification process to "lump together" two or more classified locations into a single result. The latter approach may additionally lump together or combine confidence levels (or other statistical measures) to determine a single, most likely cumulative tap location or region. Such confidence levels may, for example, be summed or accumulated to result in lumped or regional confidence levels. In some outlier cases when using this approach, the cumulative probability of a collection of two or more classified locations with a modest degree of certainty may exceed a single location with a higher level of certainty but that is surrounded by classified locations with low levels of certainty.

In further examples, the use of tap locations and/or signalling motions (e.g., following a tap) by a device used to control virtual actions or objects may take into account interactive context, leading to a concept of "interpretive control". "Interpretive control" may relax constraints on tap location(s), orientation(s), and/or motion(s) specified by one or more controllers based on context. For example, if responses to a visual or auditory query are intended to be based on tapping one of three displays and a correct response is indicated by tapping the left display of the handheld device (e.g., see FIG. 1A), then interpretive control may allow a tap (e.g., particularly by a young child) located anywhere on the left side of the handheld device to be interpreted as a correct answer.

Figure 1B:
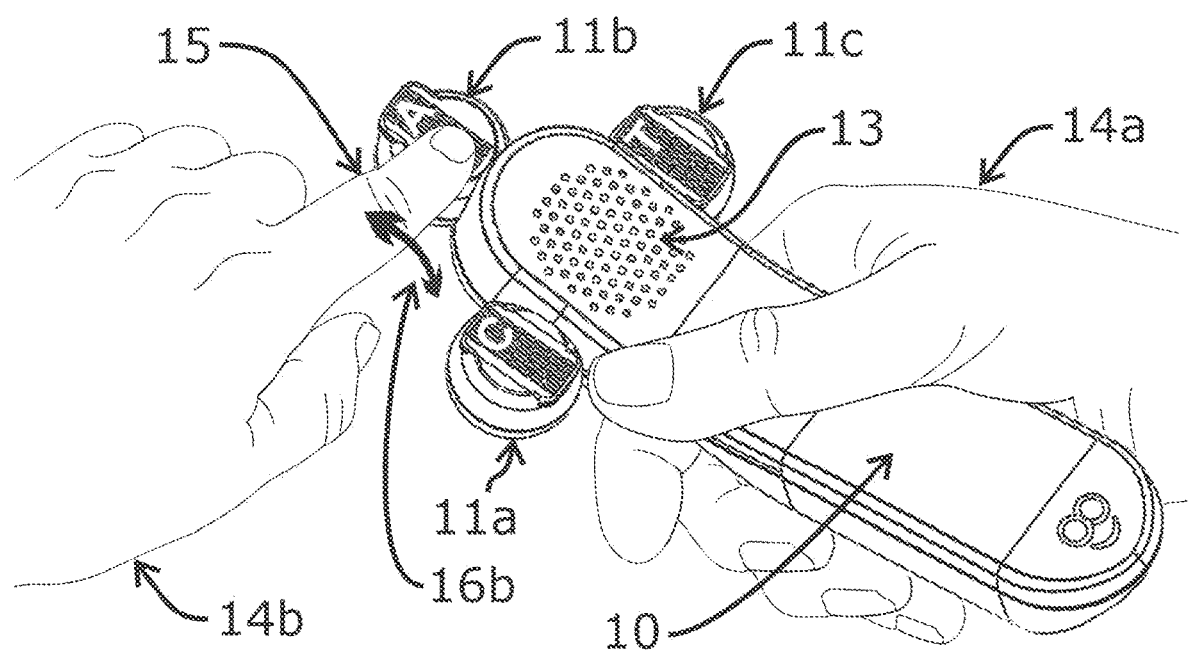
FIG. 1B follows on from the scenario shown in FIG. 1A, in which the index finger of the hand that opposes the hand used to cradle the handheld device taps on the center device display (projecting the letter "A") as a means of machine-based interaction.

Interpretive control may reduce the tap location accuracy, timing constraints, repetition rates, and/or number of degrees of freedom required of controlling devices by making assumptions about user intent based on interactive context. Examples of contextual interpretations that may lead to a relaxing of controller precision include specifying a choice from a limited number of viable selections, using one or more previous and/or frequent selections to arrange choices at tap locations that are more readily accessible (e.g., tapping on the displays as depicted in FIGS. 1A and 1B), utilizing tap patterns that make similar selections easy to indicate (e.g., a double tap at a location indicates that a previous tap pattern at the selected location should be repeated), and so on.

Interpretive control may be applied not only to enact or modulate virtual activities based on tap location, but also based on tap attributes such as device orientation and or movements during, or immediately following, a tap. For example, device motion during and/or following a tap may be used to hammer a virtual nail (e.g., shown on a connected display device). Interpretive control may allow any device motion following a tap (e.g., in any direction) to result in video sequences of the nail being hammered (e.g., absent requirements to directionally strike the nail head or any minimum movement velocity for the nail to move within a virtual board). Further, using interpretive control, the nail may be driven fully into a virtual board after only a limited number (e.g., three) of motions representing hammer strokes. Along similar lines, rotation of a handheld device following a tap may be used to control a virtual screw driver where any degree of rotation may result in a full turn of the screw and (similar to the hammering of a nail, just described) a limited number of rotations may fully insert the screw.

Interpretive control may be particularly useful within interactions involving the very young, the elderly, or those with reduced motor and/or cognitive functions. Further aspects of "interpretive control" are more fully described in U.S. Pat. No. 11,334,178, filed Aug. 6, 2021, and co-pending application Ser. No. 17/531,571 filed Nov. 19, 2021, the entire disclosures of which are expressly incorporated herein by reference. Determining context from audiovisual content and subsequently generating interpretive control based on such contexts are more fully described in U.S. Pat. No. 11,366,997, filed Apr. 17, 2021, the entire disclosure of which is expressly incorporated herein by reference.

Within further examples, "bimanual control" of one or more virtual objects may be implemented by combining an ability to specify locations on a touch-sensitive display using one or more fingers (or employing one or more pointing instruments, such as a stylus) of one hand with substantially simultaneously generating additional activity control and/or modulation functions via a handheld device using a second hand. Bimanual control that combines location determined on a touch-sensitive display with measured features of a tap on a handheld device (e.g., tap location, timing and/or attributes) may produce multiple degrees of freedom while controlling virtual objects or activities. In the case of a single user, touching a touch-sensitive display with a finger of one hand may confine the ability to tap a handheld device to using a digit of the hand holding the device and/or to tapping the device against a solid surface. Aspects of bimanual control by a single device user are more fully described in U.S. Pat. No. 11,334,178, filed Aug. 6, 2021, the entire disclosure of which is expressly incorporated herein by reference.

Bimanual control may also be implemented by specifying a location on a touch-sensitive screen by one user while, substantially simultaneously, a finger (or other tap mechanism) of a second user may generate taps on a handheld device. Such control functions by two separate users (who may be interacting remotely via telecommunications) may cooperatively perform and/or modulate virtual actions and activities. Bimanual, cooperative control implemented by two device users are further described in co-pending application Ser. No. 17/531,571 filed Nov. 19, 2021, the entire disclosure of which is expressly incorporated herein by reference.

Within additional examples, although not "handheld" in a strict sense, portable electronic devices may be affixed and/or manipulated by other parts of the human body. A device in which the locations of taps are determined based on IMU data streams may, for example, be affixed to an arm, leg, foot, or head. Such positioning may be used to address accessibility issues for individuals with restricted upper limb and/or hand movement, individuals absent a hand, and/or during situations where a hand may be required for other activities. Tap timing and locations may be tracked based on tap motions while held or generated by other body parts.

The handheld device may additionally include one or more of one or more touch controls, one or more microphones, one or more scroll wheels, one or more photodiodes, one or more cameras, an optical heart sensor, and an electrical heart sensor, each operatively coupled to the device processor. Coupled with tap location, timing and attributes, these components may provide additional means for user control of actions using the handheld device. In addition, a battery, providing power to the electronic components, may allow the handheld device to operate untethered from any other power source.

Within yet further examples, the sensing of tap location based on IMU data streams may largely (although not necessarily) eliminate needs for pushbuttons and/or other forms of (e.g., finger-based) contact controls; however, the elimination of a physical switch does not imply that the appearance of a contact structure also be eliminated. Indeed, images of push buttons or any other symbols may be applied to (e.g., painted on) surfaces of the handheld device at different potential tap locations. For example, catering particularly to young children, different tap locations may be indicated by brightly colored circles (or other shapes) on the surface of the handheld device. Optionally, such symbols may be applied using temporary adhesives (i.e., including as so-called "stickers) that may be exchanged for different user applications or simply for fun as a child ages and/or develops different personal preferences. Such adhesive and/or fastened components may be an element of different skins and/or other accessories that may be used to "dress-up" a handheld device (e.g., as a doll, puppet, or miniature toy car).

FIGS. 1A and 1B illustrate exemplary tap sequences that allow a device user to indicate selections from available responses shown on displays 12a, 12b, 12c of a handheld device 10. Specifying such responses may, for example, be included within machine-based interactions during educational sessions designed to help a young child learn to spell and/or pronounce words. In this example, algorithms used to classify tap locations may be informed that possible outcomes are confined to the three locations of device displays (i.e., a small number compared with typical applications, potentially simplifying classification processes).

FIG. 1A shows the handheld device 10 being held in the right hand 14a of a device user (except for hands, remainder of the body of the user not shown). The handheld device includes three spherical components 11a, 11b, 11c that may be used as elements of camera-based tracking (not shown) of the device. Each of the three spherical components 11a, 11b, 11c includes a display 12a, 12b, 12c that separately projects the letters "C" at 12a, "A" at 12b, and "T" at 12c; together, making up the word "CAT". A grating that covers a speaker 13 within the handheld device is also visible from the viewing perspective of FIGS. 1A and 1B.

During a session using the electronic device, the young child may be asked to find the first letter, C, within the word "CAT." Alternatively, or in addition, the child may be asked (e.g., via the speaker, 13) to indicate a letter that can produce a phonetic "k" sound. As illustrated in FIG. 1A, the child responds using the index finger 15 of a left hand 14b to strike or tap (i.e., via an up-and-down motion 16a) the top of the sphere 11a containing the display 12a that projects the letter "C". Classification of which sphere was tapped may then be performed based on acquired IMU data to, in turn, determine if the answer selected by the child was correct.

As illustrated in FIG. 1B, the child may then be asked to find the next character, "A", and/or the sound associated with the phonetic symbol "m,". A correct answer may be indicated by tapping anywhere on the middle sphere 11b of the handheld device 10. FIG. 1B shows the child using the same up-and-down motion 16b of an index finger 15 of a left hand 14b to strike the center sphere 11b. Once struck, classification processes to determine which sphere was tapped may be performed based on acquired IMU data that, in turn, allows a determination whether the answer indicated by the tap was correct.

Figure 2:
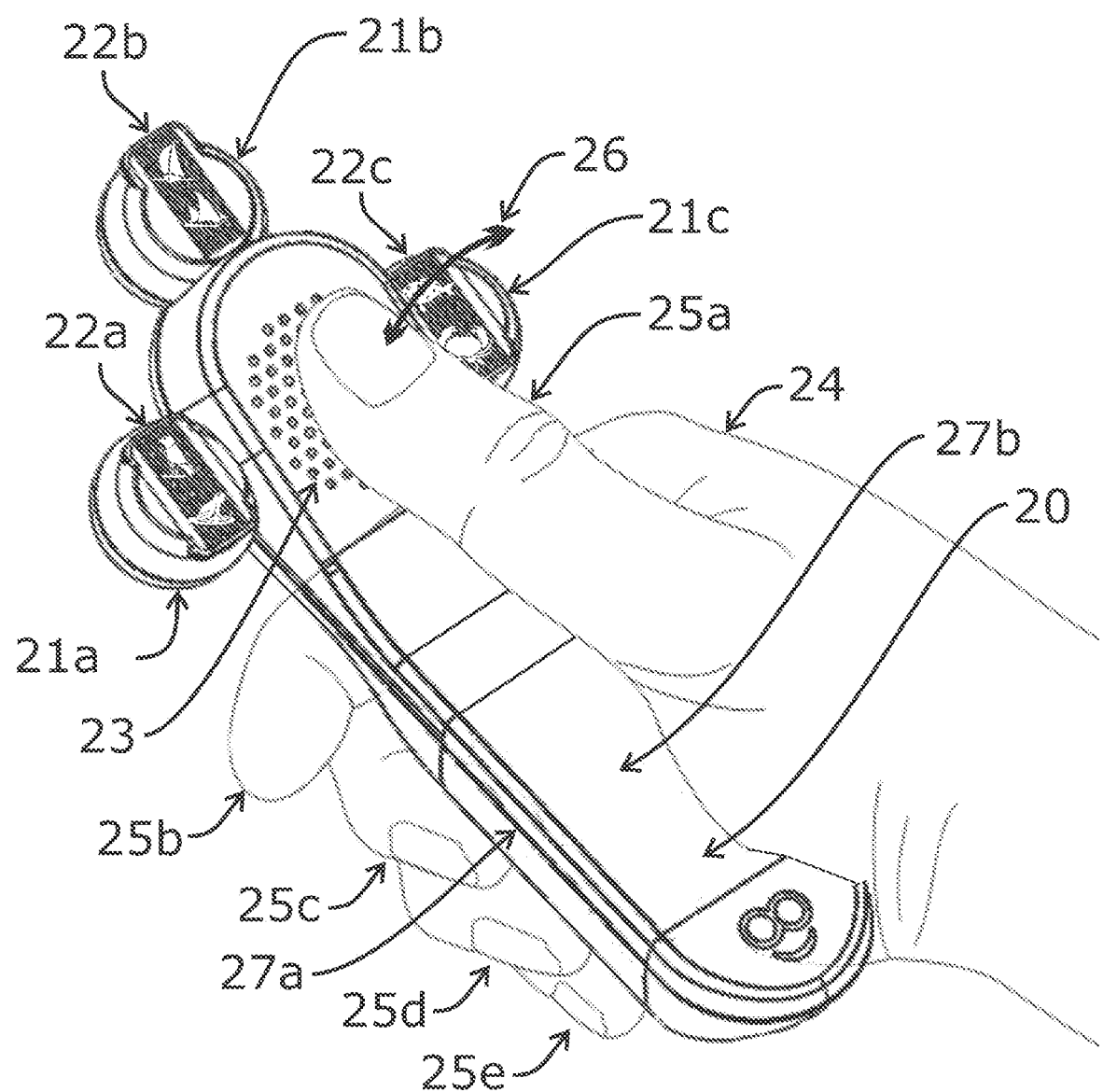
FIG. 2 illustrates the use of a thumb of the same hand used to hold the handheld device to, as a means for interaction, tap on the upper body of the handheld device including in a region containing a device speaker (e.g., in response to interactive sounds produced by the speaker).

FIG. 2 illustrates an ability to indicate tap locations on the handheld device 20 using a single hand 24. In this case, the handheld device 20 is shown cradled by the right hand of a device user. The right-hand palm (hidden by the device in FIG. 2) and fingers 25b, 25c, 25d, 25e excluding the thumb 25a are able to mechanically stabilize the overall device 20, allowing for movement of the right-hand thumb 25a (i.e., relative to the device 20) including reaching the device speaker 23 and three spherical, camera-based tracking components 21a, 21b, 21c, where each of the three spheres includes a display 22a, 22b, 22c.

The area in the region of the speaker 23 and the three spheres 21a, 21b, 21c are readily accessible to the thumb 25a. For most individuals (i.e., depending on manual dexterity) regions along the left side 27a and on much of the top surface 27b of the device 20 may also be tapped by curling the thumb 25a. Individual fingers 25b, 25c, 25d, 25e may be used to tap a side of the device 20. It is even possible to tap the backsides of the displays 21a, 21b, 21c, the right side of the handset (not shown within the viewing perspective of FIG. 2) and/or the bottom (not shown) of the handheld device 20 by manually rotating the device (i.e., still using a single hand) prior to tapping.

In response to an auditory prompt using the device speaker 23 and/or a visual prompt projected by any of the displays 22a, 22b, 22c, the user may tap with a thumb 25a to indicate a selected response. As shown in FIG. 2, a simple up-and-down motion of the thumb produces a tap in the region of the speaker 23. Alternatively, or in addition, a device user may indicate a response and/or selection by tapping multiple times 26 in approximately the same region of the device. Once struck, classification processes to determine which region of the device was tapped and/or the timing of multiple taps may be performed based on acquired IMU data.

Figure 3A:
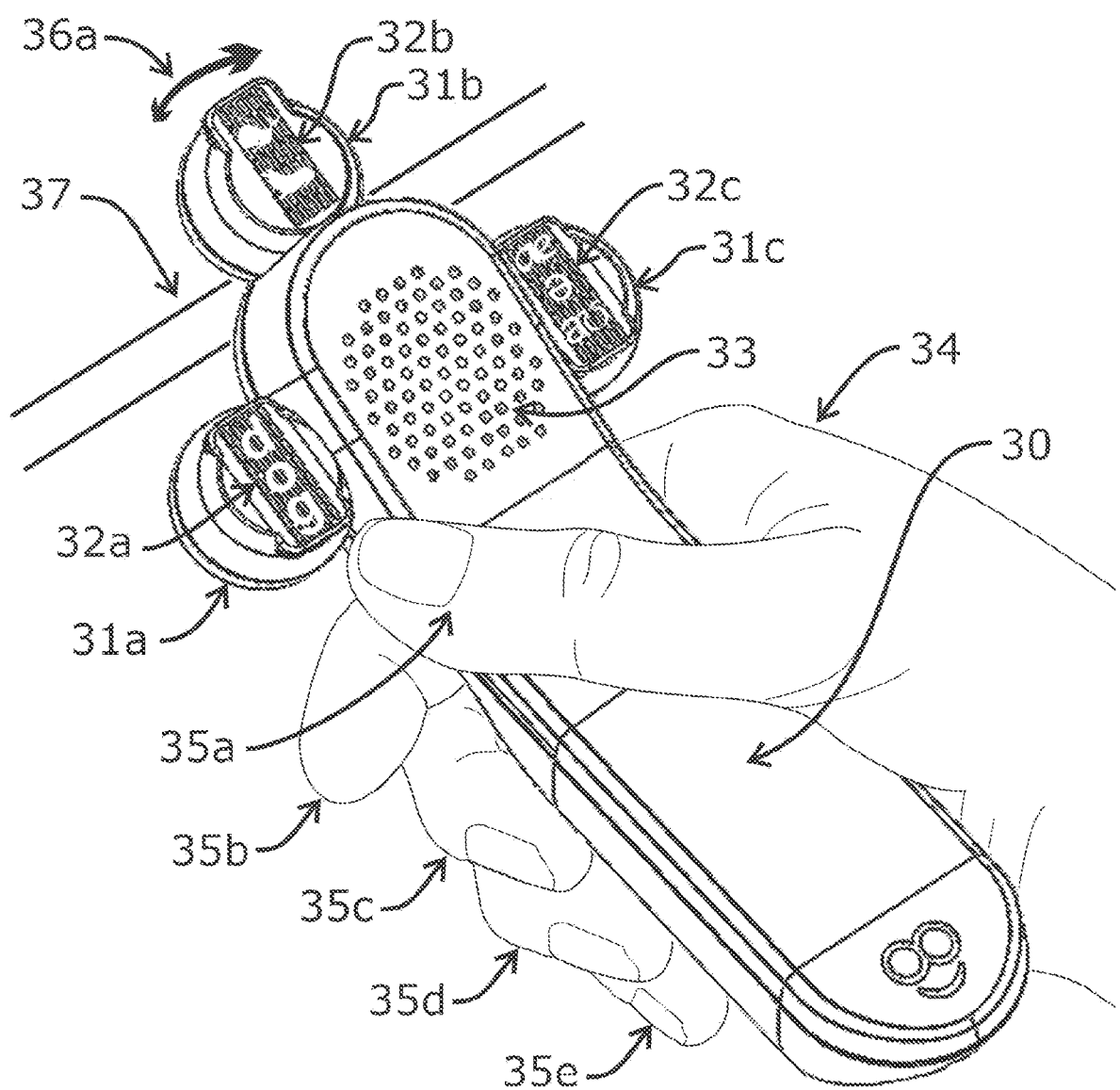
FIG. 3A illustrates tapping the center display (projecting images of aquatic animals) of a handheld device against a rigid object (e.g., surface of a table or desk) as a means of interaction by a device user.
Figure 3B:
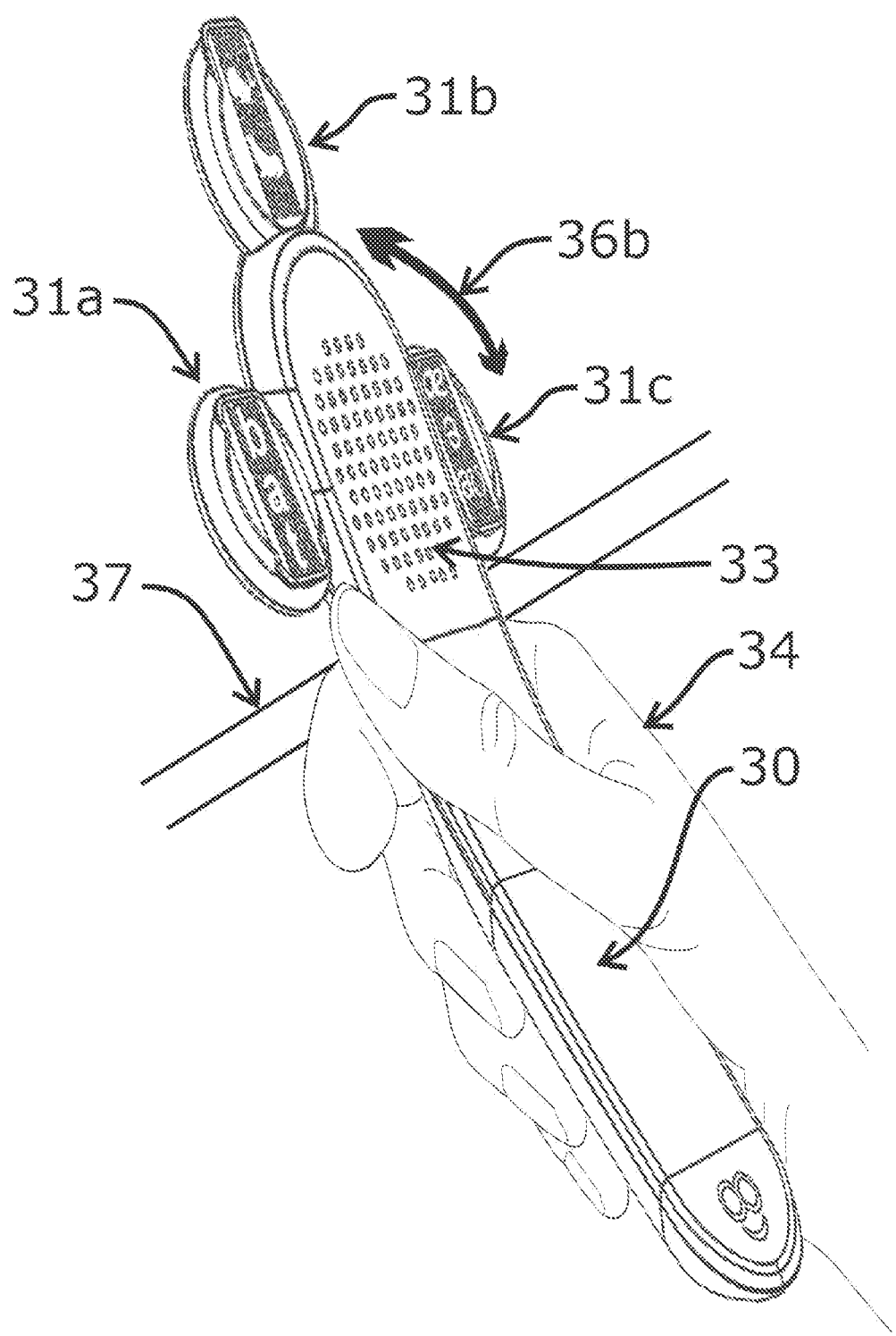
FIG. 3B, similar to the scenario shown in FIG. 3A, illustrates tapping the rightmost display (shown projecting symbols that represent phonetic sounds) onto a rigid object (e.g., surface of a table or desk) as a means for human-machine interaction.

FIGS. 3A and 3B illustrate moving the handheld device itself 30 to strike or tap a selected region of the device against an object or surface 37. A handheld device 30 is shown being held by the palm (blocked from view by the device) and fingers 35b, 35c, 35d, 35e including the thumb 35a of a right hand 34 of the user. Each of the three spherical elements 31a, 31b, 31c affixed to the device contains a display 32a, 32b, 32c. The leftmost display projects the word "dog" 32a. The center display 32b shows images of animals and the leftmost display 32c illustrates symbols representing different phonetic sounds. A perforated cover over an embedded speaker within the device 30 can also be seen within the viewing perspective of FIGS. 3A and 3B.

In FIG. 3A, in response to a visual prompt (e.g., on a display 32b) or auditory cue (e.g., via the speaker 33), the device user may wish to indicate that the center display 32b showing animals is a selected response. The user may indicate this response by striking 36a the bottom side of the center sphere 31b against a solid surface such as the edge of a table or desk 37. Once struck, classification processes to determine which sphere was tapped (i.e., including identification that a bottom display surface has been struck) may be performed based, at least in part on acquired IMU data. Classification processes may also distinguish (e.g., based on large peak amplitudes and short duration of accelerations during the strike) that the device 30 was struck against a rigid object versus a tap generated by a finger (i.e., generating lesser movement and/or acceleration forces by a softer contact surface).

Following on and as demonstrated in FIG. 3B, a desired response to a subsequent prompt may involve tapping the rightmost display 31c (i.e., displaying symbols representing phonetic sounds) against a solid surface 37. In this case, the handheld device 30, including its three displays 31a, 31b, 31c and speaker 33 are rotated slightly by the right hand 34 of the device user prior to performing an up-and-down tapping motion 36b against the corner of a table or desk 37. Once struck, based on acquired IMU data, classification processes may determine that the outer edge of the rightmost display sphere 31c was struck onto a solid surface 37 and that the device was moved (sideways) to produce the tap.

Figure 4A:
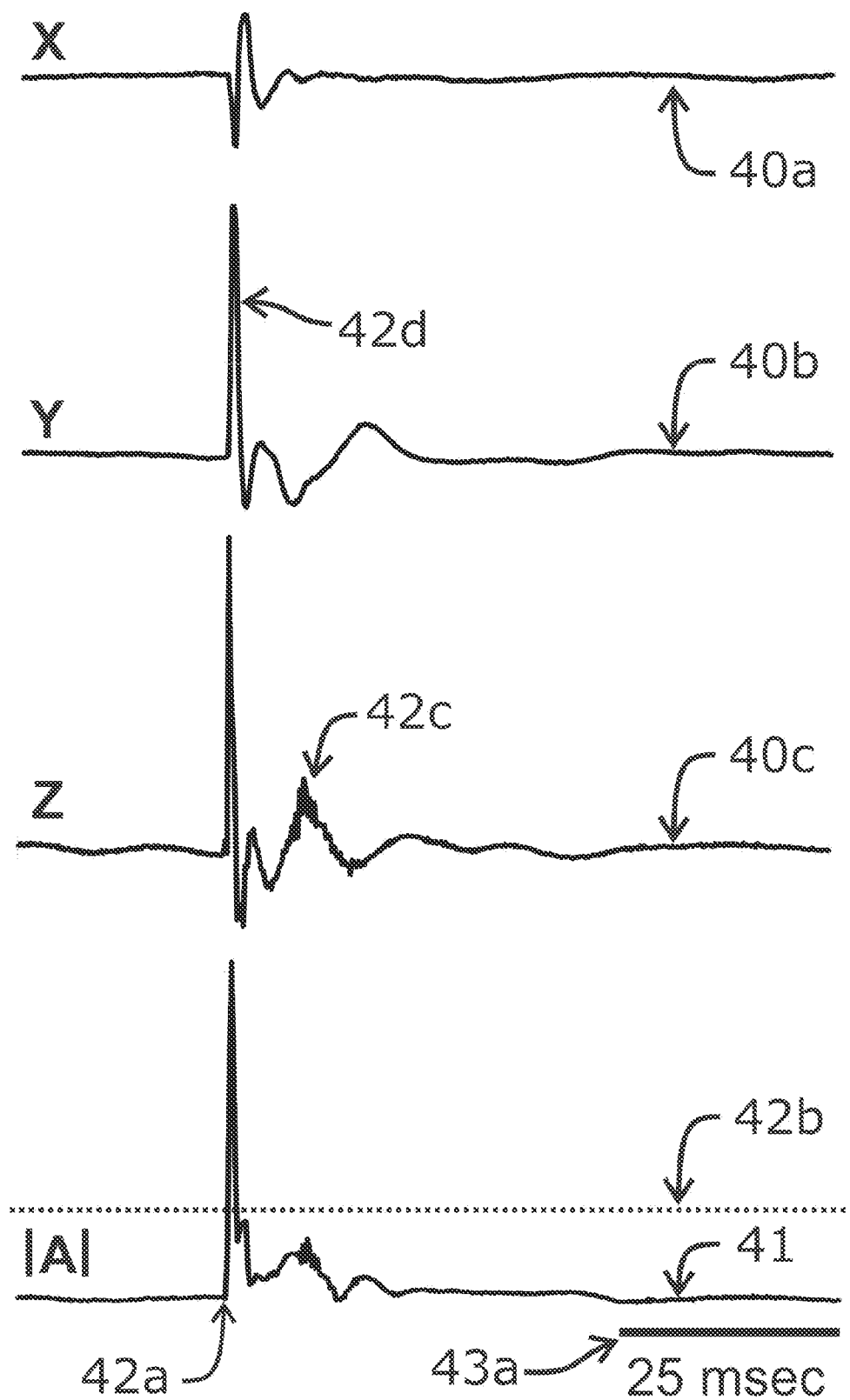
FIG. 4A shows exemplary sampled data from three IMU accelerometer channels and a computed acceleration magnitude trace during a time when the left display of a handheld device was tapped using a finger (see FIG. 1A), illustrating methods that may be used to detect the occurrence and location of a tap.
Figure 4B:
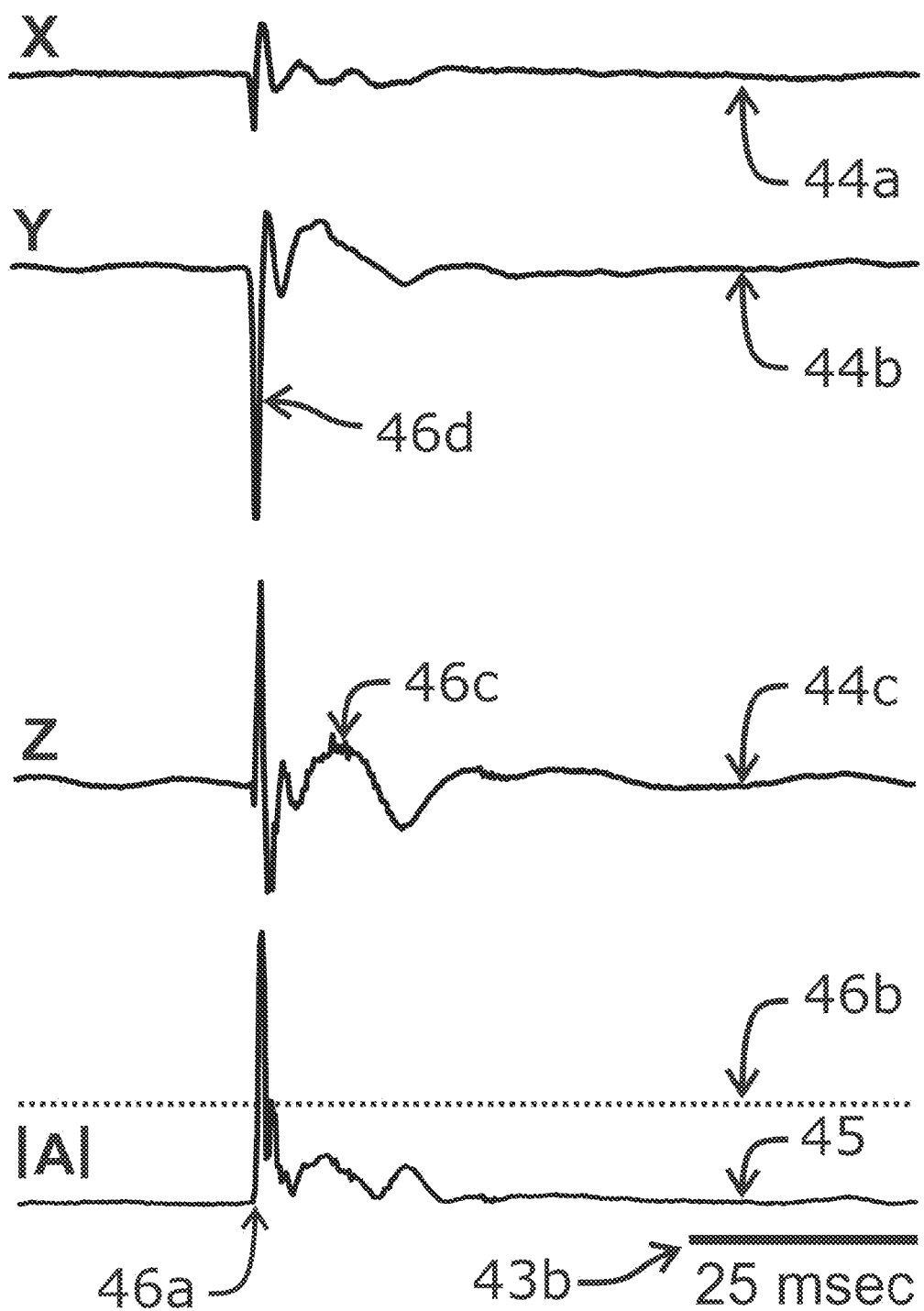
FIG. 4B shows exemplary acceleration data and computed acceleration magnitude traces during a time when the right display of a handheld device was tapped by a finger, illustrating differences in accelerations (i.e., compared with FIG. 4A showing traces when the left display was tapped) that may be identified to help determine tap location.
Figure 4C:
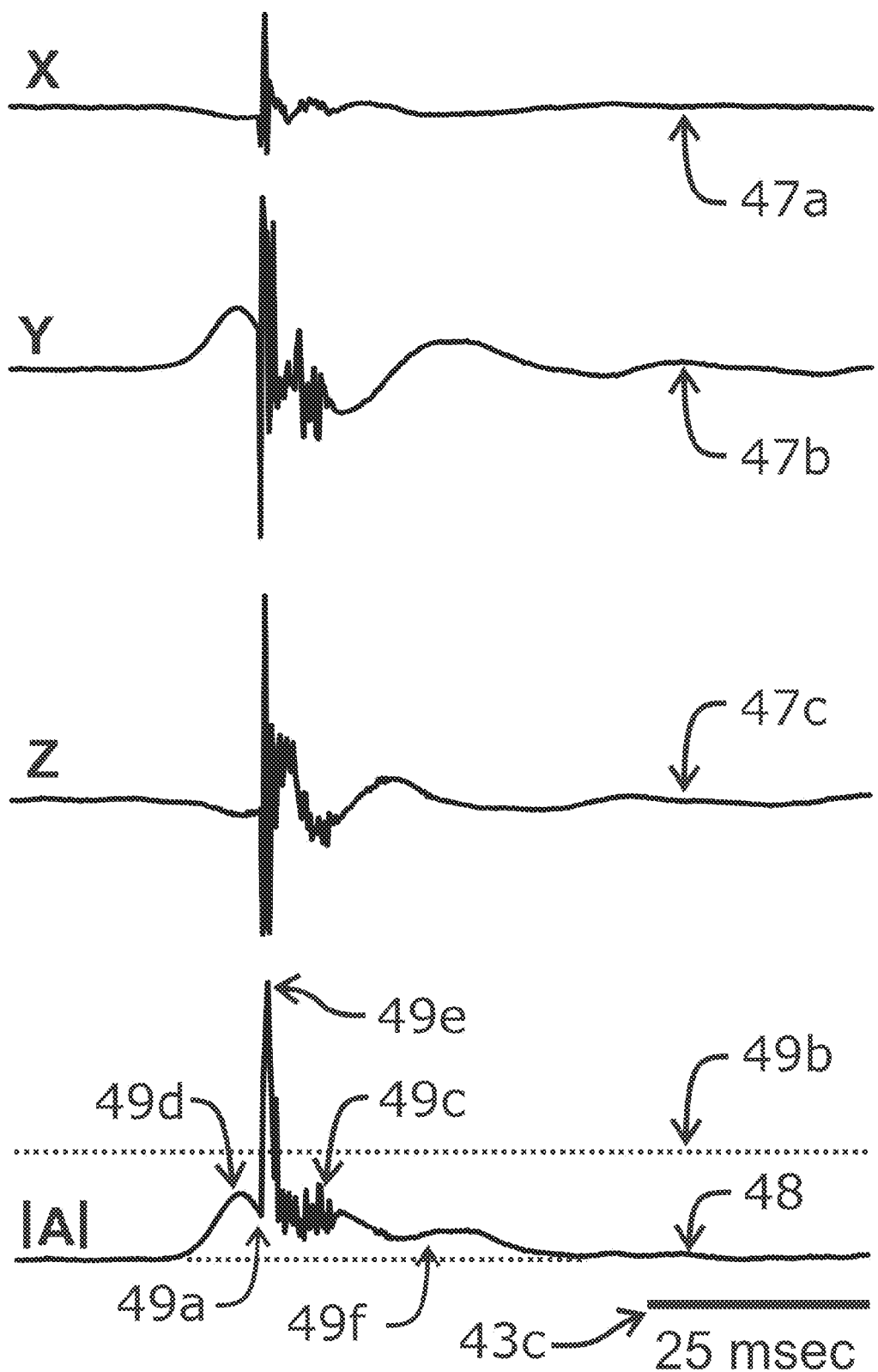
FIG. 4C shows exemplary acceleration data and computed acceleration magnitude traces during a time when the right display of a handheld device was struck against a desktop, illustrating differences in traces (i.e., that may be used to identify tap modes or attributes) when a display was struck against a solid surface versus tapping the right display with a finger (e.g., compared with traces shown in FIG. 4B).

FIGS. 4A, 4B and 4C show examples of IMU accelerometer data acquired while tapping a handheld device, illustrating some of the distinctive features within data streams produced by different forms of taps, and taps at different locations. In each plot, data from a three-axis accelerometer are shown where the three orthogonal axes (denoted X, Y and Z) are oriented approximately along axes depicted in FIG. 5. Accelerometer measurements for each axis were sampled at about 6,667 samples/second. Treating accelerometer data as a three-dimensional vector, the magnitudes of accelerations, |A|, are also shown, computed according to $$|A| = \sqrt{(X_i - X_b)^2 + (Y_i - Y_b)^2 + (Z_i - Z_b)^2} \quad \text{(eqn. 1)}$$

where $x_i$, $Y_i$ and $Z_i$ represent accelerometer samples (i.e., where "i" represents sample index) in each of the three dimensions; and $X_b$, $Y_b$ and $Z_b$ represent so-called "baseline" values in each of the same three dimensions. Baseline values may take into account factors such as electronic offsets of samples and may be determined during periods (e.g., by computing average values to reduce the effects of noise) when there is no movement of the accelerometers. Three-dimensional acceleration directions may also be computed from such data streams; however, these are not shown in FIGS. 4A, 4B and 4C. Multi-dimensional IMU gyroscope data streams and pointing vectors toward the gravitational and/or magnetic pull of the earth are also not shown.

FIG. 4A shows data acquired during a tap using an index finger of an opposing hand (i.e., relative to a hand holding the device) to tap a left display of a handheld device, similar to the action represented in FIG. 1A. Acceleration traces in the X at 40a, Y at 40b and Z at 40c axes were used to compute acceleration magnitude, |A| at 41, as described by equation 1. In FIG. 4A, the vertical scales for acceleration were not calibrated in absolute terms; however, values in X 40a, Y 40b and Z 40C dimensions may be compared relative to each other. The time bar at 43a represents 25 milliseconds.

The occurrence and time of occurrence 42a of a tap was identified as a result of the acceleration magnitude 41 exceeding a predetermined threshold 42b. Such thresholds may take into account signal noise as well as the amplitudes of accelerations that are the result of taps versus device movements that are not taps (e.g., to perform other hand gestures). As described above, the accuracy of determining the time of the tap may be increased by extrapolating samples in the region where the signal exceeds a threshold 42a back to a baseline level. Among other distinctive features within these accelerometer data (e.g., compared with traces in FIGS. 4B and 4C), the initial acceleration of a tap in the Y axis is displayed as a sharp rise in the positive direction 42d. As discussed further below, there is also a trace feature 42c in the Z axis about 5 milliseconds after initial tap contact that may be the result of breaking contact between the finger and the left display of the handheld device.

FIG. 4B shows data acquired during a tap using an index finger of an opposing hand to tap a right display of a handheld device. Acceleration traces in the X at 44a, Y at 44b and Z at 44c axes were used to compute acceleration magnitude, |A| at 45, according to equation 1. Vertical scales for all acceleration traces 40a, 40b, 40c, 44a, 44b, 44c are the same in FIGS. 4A and 4B. In FIG. 4B, the time bar 43b represents 25 milliseconds. The occurrence and time of occurrence 46a of a tap was identified when the acceleration magnitude 45 exceeded a predetermined threshold 46b.

In FIG. 4B (in contrast to FIG. 4A), the initial acceleration in the Y axis 44b following the tap at 46a is in the negative Y direction 46d. The initial positive acceleration 42d resulting from tapping the left display shown in FIG. 4A versus the initial negative acceleration 46d following tapping of the right display in FIG. 4B may be a consequence of the left and right displays being located on opposite sides of the Y axis (see FIG. 5).

Similar to FIG. 4A, FIG. 4B also shows a trace feature 46c in the Z axis about 5 milliseconds after initial tap contact. Some traces collected during other taps (not shown) reveal trace features in different axes at approximately the same times following a tap up to magnitudes that approach the amplitude of the initial tap. This trace feature may be a result of breaking contact between the finger and the device (e.g., that may exhibit mechanical variability from tap to tap in forces generated during separation).

FIG. 4C shows data acquired during a process of tapping the rightmost display of the handheld device against a solid surface (i.e., a desktop) similar to the action represented in FIG. 3B. Acceleration traces in the X at 47a, Y at 47b and Z at 47c axes were used to compute acceleration magnitude, |A| at 48, according to equation 1. Vertical scales for all acceleration data are about 60% greater (i.e., peak amplitudes are greater in FIG. 4C) compared with FIGS. 4A and 4B. In FIG. 4C, the time bar 43c represents a duration of 25 milliseconds. The occurrence and time of occurrence 49a of the tap was identified as a result of the acceleration magnitude 48 exceeding a predetermined threshold 49b.

In cases involving movement of the handheld device toward a solid surface, the acceleration of the device itself may be viewed in data streams (e.g., at 49d). Peak amplitudes resulting from such device movements may generally be less than those produced by any form of tap. Additionally, peak amplitudes (e.g., at 49e) of taps against a rigid surface (e.g., desktop) may generally be greater than taps generated using a finger (or other, softer surface). Taps of the handheld device against a solid surface may also generate high-frequency accelerations (e.g., reverberations) for a period (e.g., about 6 milliseconds at 49c) following the tap. As the handheld device is moved back after striking the solid surface, the magnitude of acceleration traces, |A| at 48, does not return quickly to baseline levels (e.g., at 49f) until retraction movements by the device user are fully completed. Such distinctions (e.g., FIG. 4C compared with FIGS. 4A and 4B) are examples of features that may be used to distinguish taps that use a finger or other object to strike the handheld device versus using the device to strike another object.

FIG. 5 illustrates considerations for assigning coordinate systems that may be used, particularly during numerical approaches, to classify taps when determining tap location. The coordinate system shown in FIG. 5 is composed of traditionally labelled X at 55a, Y at 55b, and Z at 55c axes with an origin 54 at the geometric center of the handheld device 50. Additionally, rotational movements about the X at 56a, Y at 56b and Z at 56c axes (i.e., corresponding to pitch, roll and yaw) may be expressed. Other coordinate systems are also possible including, for example, using polar coordinates and/or placing the origin at the geometric or operational center of an IMU component located internally (not shown) within the device 50. If the one or more IMU components have the ability to sense gravitational and/or magnetic pull of the earth, then coordinate systems of the handheld device 50 may additionally be expressed relative to a vector 57b pointed in the direction of the pull of the earth 57a.

Taps at different locations on the handheld device 50 produce different translational and rotational movements (i.e., measured using multi-dimensional accelerometers and gyroscopes, respectively) that may be expressed using such one or more coordinate systems. As illustrated in FIGS. 4A, 4B and 4C, IMU data streams may represent rotational and/or translational movements that result from taps at different (i.e., known) locations on the device 50 (i.e., a "forward" mathematical approach). Distinctions among such movements (i.e., the "reverse" mathematical approach) may then be used within algorithmic strategies (e.g., numerical, neural network-based) to classify tap locations.

As an example, a tap at 52a on the left sphere 51a may distinctively result in a rotational movement in the negative direction 56b about the Y axis 55b, coupled with rotational movement in the positive direction 56a about the X axis 55a. On the other hand, a tap at 52b on the center sphere 51b may produce little rotational movement 56b about the Y axis 55b, but significant torque in the positive direction 56a about the X axis 55a. In further contrast, a tap at 52c on the right sphere 51c may distinctively result in a rotational movement in the positive direction 56b about the Y axis 55b, coupled with rotational movement in the positive direction 56a about the X axis 55a. Within yet further distinctions, a tap in the area of the speaker at 53 of the handheld device 50 may produce only minor rotational movement about any axis, but measurable translational movement in the negative Z axis 55c direction. As one more example, a tap on the lower left side of the device at 58 may primarily and distinctively result in significant rotational movement in the positive direction 56c about the Z axis 55c.

Figure 6:
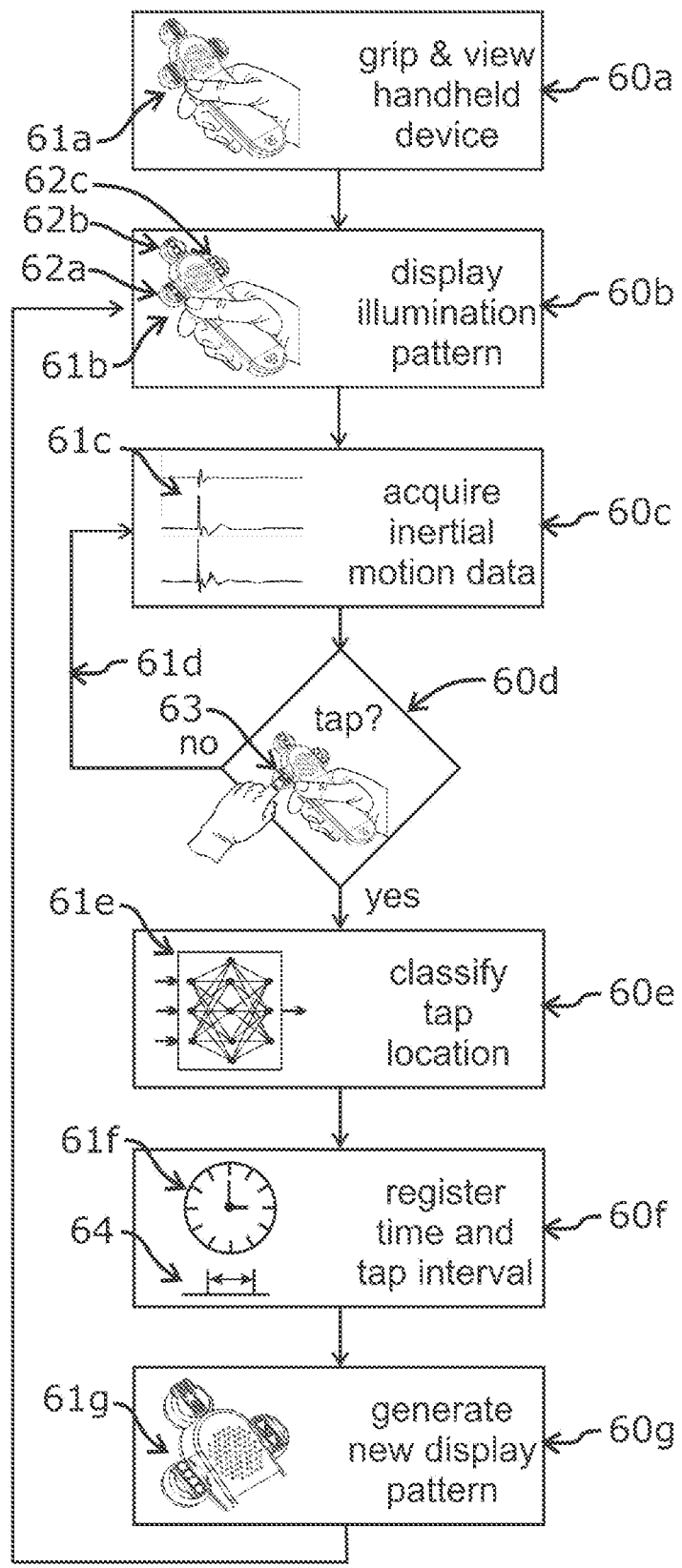
FIG. 6 is a flowchart outlining exemplary steps to process and locate a tap-based interactions following projection of an illumination pattern on one or more handheld device displays.

FIG. 6 is a flowchart that outlines exemplary steps to classify tap locations on a handheld device in response to images, symbols and/or illumination patterns generated on device displays. Initially 60a, a user may grip the handheld device 61a to enable tapping and viewing displays 62a, 62b, 62c. Next 60b, an initial illumination pattern (e.g., containing one 62a, two 62b, or three dots 62c) may be projected by the displays 61b, viewable to the device user. IMU data are then acquired 60c and analysed (e.g., including computed magnitudes of movements) to determine if movements exceed a threshold 61c (i.e., indicating the occurrence of a tap). If the threshold is not exceeded 60d, then further IMU data are gathered 61d. If IMU data exceed the threshold or other criteria used to determine the occurrence of a tap 60d, then data around the time of tap determination are gathered to perform tap location classification 60e.

FIG. 6 illustrates the use of a neural network 61e to perform the classification process 60e. In this exemplary approach, IMU data in the region around the time of exceeding a threshold are input to a neural network. A most likely tap location (e.g., the leftmost spherical display 63) may be generated as a neural network output, optionally, along with other attributes such as a degree of confidence regarding the most likely tap location and measured forces applied during the tap (e.g., related to type of tap and/or other tap attributes).

In addition, temporal data about the tap are registered 60f including the time of the tap 61f and the interval since a previous tap 64, along with determining any patterns of activity involving two or more previous taps. Based on tap location, along with other tap attributes such as timing and tap forces, a new display pattern may be generated 60g for the device display 61g. The overall process may then be repeated 60b using the new display pattern.

Figure 7:
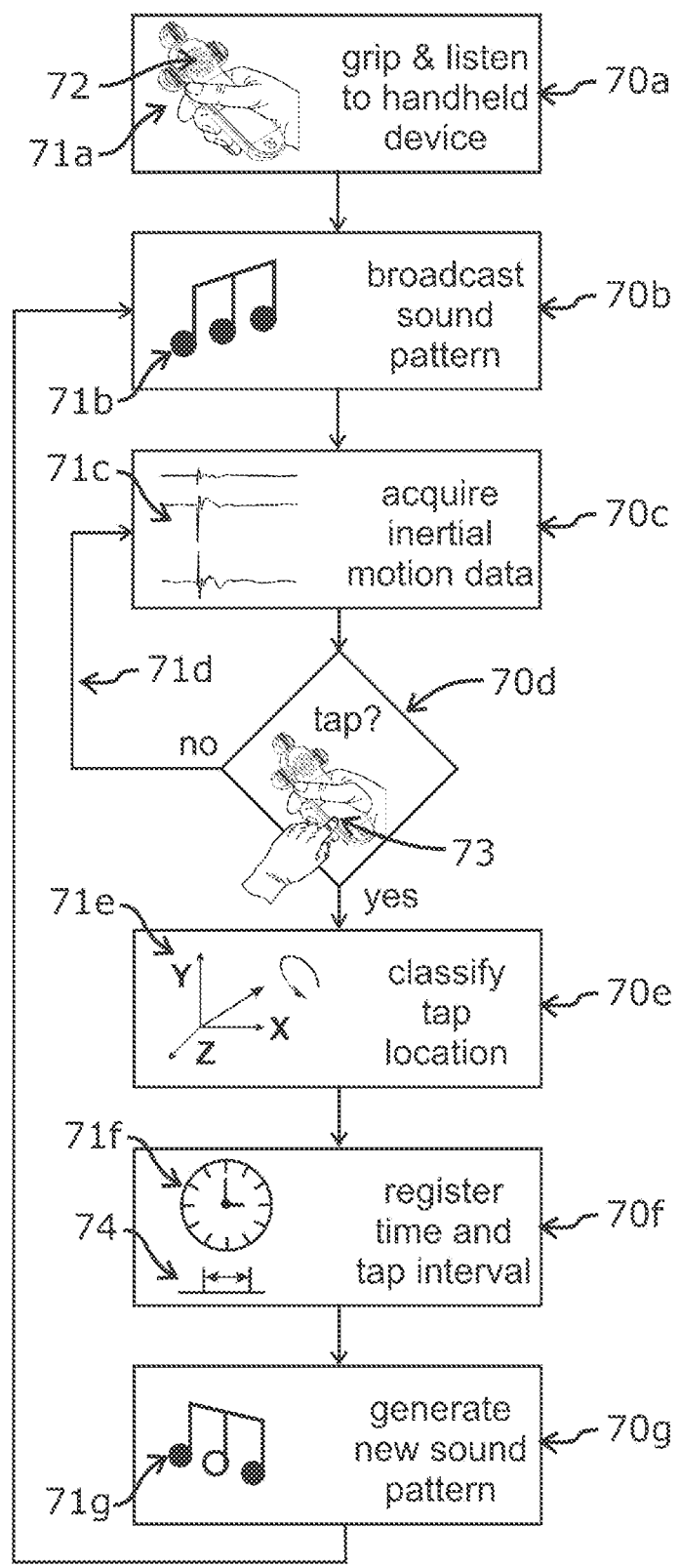
FIG. 7 is a flowchart outlining exemplary steps to process and locate a tap-based interactions following a sound generated by a handheld device speaker or buzzer.

FIG. 7 is a flowchart that outlines exemplary steps to classify tap locations on a handheld device in response to auditory cues or sounds presented using a device speaker. Sounds may, for example, comprise one or more words, one or more utterances, one or more phonetic sounds, one or more musical sounds, one or more animal sounds, one or more nature sounds, one or more bell sounds, one or more chime sounds, and/or one or more alerts.

Initially 70a, a user may grip the handheld device 71a in order to enable tapping and listening to auditory cues from the speaker 72. Next 70b, a sound pattern (in this case, a series of musical notes 71b) is broadcast on the speaker. IMU data are then acquired 70c and analysed 71c to determine if movements exceed a threshold (i.e., indicating the occurrence of a tap). If the threshold is not exceeded 70d, then the process of gathering IMU data is repeated 71d. If IMU data exceed a threshold or satisfy other criteria used to determine the occurrence of a tap 70d, then data around the time of tap determination are used to perform tap location classification 70e.

FIG. 7 illustrates the use of a numerical approach 71e to perform the classification process 70e. In this case, a tap on the lower left side of the handset 73 by the index finger of the hand opposing the hand used to grip the device may, for example, be determined based on a dominant rotational signal in the X-Z plane 71e (i.e., counter clockwise when viewed facing the upper portion of the device). A most likely tap location is computed along with, optionally, other attributes such as degree of confidence regarding the most likely tap location and forces applied during and following the tap (e.g., tap attributes).

Additional temporal data about the tap may be registered 70*f* including the time of the tap 71*f* and the interval since a previous tap 74, along with determining any patterns of activity when combined with previous taps. Based on the newly determined tap location, along with other tap attributes, a new sound pattern 71*g* may be generated for broadcast 70*g*. The overall process may then be repeated 70*b* using the new auditory stimulus.

The foregoing disclosure of the examples has been presented for purposes of illustration and description. It is not intended to be exhaustive or to limit the invention to the precise forms disclosed. Many variations and modifications of the examples described herein will be apparent to one of ordinary skill in the art in light of the above disclosure. It will be appreciated that the various components and features described with the particular examples may be added, deleted, and/or substituted with the other examples, depending upon the intended use of the examples.

Further, in describing representative examples, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A device for human interaction, comprising:
   a device body;
   electronic circuitry within the device body that includes a device processor;
   at least one device display affixed to the device body operatively coupled to the device processor; and
   at least one inertial measurement unit within the device body operatively coupled to the device processor,
   wherein the device processor is configured to:
   generate an illumination pattern on the at least one device display;
   acquire inertial measurement data from the at least one inertial measurement unit when a human generates a tap by tapping the device in response to the illumination pattern;
   determine, based solely on the inertial measurement data, a tap location on the device body when the human generates the tap; and
   perform an action based, at least in part, on the tap location.

2. The device of claim 1, wherein the illumination pattern comprises one or more of one or more alphanumeric characters, one or more symbols, one or more illumination sources, and one or more illumination animations.

3. The device of claim 1, wherein the tap is generated by the human by one of tapping a second hand onto the device being held by a first hand, tapping a second hand digit onto the device, tapping the second hand digit onto the at least one device display, tapping a first hand digit onto the device, tapping a body part onto the device, tapping the device onto a solid object, tapping the at least one device display onto the solid object, tapping the device against an additional device, and tapping the at least one device display onto an additional device display.

4. The device of claim 1, wherein the device processor is further configured to determine from the inertial measurement data, an orientation of the device relative to one or both of an earth gravitational attraction and an earth magnetic attraction.

5. The device of claim 1, wherein the device further comprises a device haptic unit operatively coupled to the device processor and, wherein the device processor is configured to activate the device haptic unit to alert the human that that the inertial measurement data are being acquired.

6. The device of claim 1, wherein the device further comprises a device speaker operatively coupled to the device processor and, wherein the device processor is configured to play one or more sounds on the device speaker to alert the human that the illumination pattern is generated on the at least one device display.

7. A device for human interaction, comprising:
   a device body;
   electronic circuitry within the device body that includes a device processor;
   a device speaker within the device body operatively coupled to the device processor; and
   at least one inertial measurement unit within the device body operatively coupled to the device processor,
   wherein the device processor is configured to:
   play one or more sounds on the device speaker;
   acquire inertial measurement data from the at least one inertial measurement unit when a human generates a tap by tapping the device in response to the one or more sounds;
   determine, based solely on the inertial measurement data, a tap location on the device body when the human generates the tap; and
   perform an action based, at least in part, on the tap location.

8. The device of claim 7, wherein the one or more sounds comprise one or more of one or more words, one or more utterances, one or more phonetic sounds, one or more musical sounds, one or more animal sounds, one or more nature sounds, one or more bell sounds, one or more chime sounds, and one or more alerts.

9. The device of claim 7, wherein the tap is generated by the human by one of tapping a second hand onto the device being held by a first hand, tapping a second hand digit onto the device, tapping the second hand digit onto the at least one device display, tapping a first hand digit onto the device, tapping a body part onto the device, tapping the device onto a solid object, tapping at least one device display affixed to the device body onto the solid object, tapping the device against an additional device, and tapping the at least one device display onto an additional device display.

10. The device of claim 7, wherein the device further comprises a device haptic unit operatively coupled to the device processor and, wherein the device processor is configured to activate the device haptic unit to alert the human that the inertial measurement data are being acquired.

11. A device for human interaction, comprising:
a device body;
electronic circuitry within the device body that includes a device processor; and
at least one inertial measurement unit within the device body operatively coupled to the device processor,
wherein the device processor is configured to:
acquire inertial measurement data from the at least one inertial measurement unit when a human generates an initial tap by tapping the device;
determine, based solely on the inertial measurement data, a tap location on the device body when the human generates the tap; and
perform an action based, at least in part, on the tap location.

12. The device of claim 11, wherein the at least one inertial measurement unit comprises one or more of one or more accelerometers, one or more magnetometers and one or more gyroscopes.

13. The device of claim 11, wherein one or both of device movement direction and device movement magnitude are computed from the inertial measurement data.

14. The device of claim 11, wherein the initial tap is generated by the human by one of tapping a second hand onto the device being held by a first hand, tapping a second hand digit onto the device, tapping the second hand digit onto the at least one device display, tapping a first hand digit onto the device, tapping a body part onto the device, tapping the device onto a solid object, tapping at least one device display affixed to the device body onto the solid object, tapping the device against an additional device, and tapping the at least one device display onto an additional device display.

15. The device of claim 11, wherein the device processor is further configured to determine one or more additional taps at one or more additional tap locations on the device body based on additional inertial measurement data acquired from the at least one inertial measurement unit.

16. The device of claim 15, wherein the device processor is further configured to determine one or more inter-tap intervals between the initial tap and the one or more additional taps and, wherein the action is further based on one or more of an initial time of occurrence of the initial tap and the one or more inter-tap intervals.

17. The device of claim 11, wherein the device processor is further configured to determine from the inertial measurement data, an orientation of the device relative to one or both of an earth gravitational attraction and an earth magnetic attraction.

18. The device of claim 17, wherein the device processor is configured to base the action, at least in part, on the orientation of the device.

19. The device of claim 11, wherein the device further comprises a device haptic unit operatively coupled to the device processor and, wherein the device processor is configured to activate the device haptic unit to alert the human that the inertial measurement data are being acquired.

20. The device of claim 11, wherein the device further comprises one or both of a Wi-Fi communications module operatively coupled to the device processor and a Bluetooth communications module operatively coupled to the device processor, communicating between the device processor and a remotely connected processor.

21. The device of claim 11, wherein the device additionally comprises one or more of one or more push buttons, one or more touch controls, one or more microphones, one or more scroll wheels, one or more photodiodes, an optical heart sensor, and an electrical heart sensor; each operatively coupled to the device processor.

22. The device of claim 11, wherein the device processor is configured to base the action, at least in part, on one or more of a device movement direction prior to the initial tap, a device movement magnitude prior to the initial tap, a tap force direction, a tap force magnitude, a device reaction movement direction after the initial tap and a device reaction movement magnitude after the initial tap.

23. The device of claim 11, wherein the device processor is configured to base the action, at least in part, on a time of the initial tap relative to one or more event times in an environment of a device user.

24. The device of claim 23, wherein the one or more event times are generated by one of an additional device and a touch-sensitive screen.

25. The device of claim 11, wherein the device body is configured to be affixed to one of an arm, a leg, a foot, a head and a hand.

26. The device of claim 11, wherein one or more target tap locations are indicated on the device body by one or more of one or more symbols, one or more painted images, one or more adhesive stickers and one or more device surface distinctions.

* * * * *